(12) United States Patent
Isozaki et al.

(10) Patent No.: US 8,584,179 B2
(45) Date of Patent: Nov. 12, 2013

(54) INFORMATION OUTPUT APPARATUS, INFORMATION PROCESSING SYSTEM AND INFORMATION PROCESSING METHOD

(75) Inventors: Hiroshi Isozaki, Kawasaki (JP); Noriya Sakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 3 days.

(21) Appl. No.: 13/234,552

(22) Filed: Sep. 16, 2011

(65) Prior Publication Data

US 2012/0079551 A1 Mar. 29, 2012

(30) Foreign Application Priority Data

Sep. 27, 2010 (JP) ................................. 2010-215958

(51) Int. Cl.
*H04N 7/18* (2006.01)
(52) U.S. Cl.
USPC ............................. 725/80; 725/141; 709/219
(58) Field of Classification Search
USPC ...................... 725/78–84, 131–134, 139–142, 725/151–153; 709/217–232
See application file for complete search history.

(56) References Cited

U.S. PATENT DOCUMENTS 6,753,928 B1 *  6/2004 Gospel et al. ................. 348/569
7,007,234 B2 *  2/2006 Hawkins ........................ 715/722
7,038,738 B2 *  5/2006 Kwon ............................ 348/734
2009/0328121 A1 * 12/2009 Kato .............................. 725/110
2011/0083141 A1 *  4/2011 Westberg et al. ............... 725/31

OTHER PUBLICATIONS

"High-bandwith Digital Content Protections System", Revision 1.4, Jul. 8, 2009.
"Hybrid Broadcase Broadband TV", ETSI TS 102 796 v1.1.1 (Jun. 2010), Technical Specification.
"DTCP vol. 1 Supplement E Mapping DTCP to IP (Information Version)" Revision 1.31, Sep. 10, 2010.

* cited by examiner

*Primary Examiner* — Annan Shang
(74) *Attorney, Agent, or Firm* — Turocy & Watson, LLP

(57) ABSTRACT

An information output apparatus has a first interface to receive an equipment operational signal from a short-range wireless communication apparatus, a second interface to receive broadcast wave data based on the equipment operational signal, a third interface to transmit the equipment operational signal to an information generating apparatus, a fourth interface to receive video data transmitted from the information generating apparatus, a fifth interface to receive a control command transmitted from the information generating apparatus in response to the equipment operational signal transmitted from the third interface part, an information superimposing part to transmit the equipment operational signal from the third interface part to the information generating apparatus and then to superimpose video data updated by the information generating apparatus and received from the fourth interface part with the broadcast wave data to display the superimposed data on a display part.

22 Claims, 22 Drawing Sheets

INFORMATION OUTPUT APPARATUS, INFORMATION PROCESSING SYSTEM AND INFORMATION PROCESSING METHOD

CROSS REFERENCE TO RELATED APPLICATIONS

This application is based upon and claims the benefit of priority from the prior Japanese Patent Application No. 2010-215958, filed on Sep. 27, 2010, the entire contents of which are incorporated herein by reference.

FIELD

Embodiments of the present invention relate to an information output apparatus, an information processing system, and an information processing method that are capable of displaying data adding a variety of information to broadcast wave data.

BACKGROUND

TVs having an Internet connection function have recently been increased. However, different from PCs, most TVs are not equipped with a high-performance processor. Therefore, when the same browser as that of PCs is run on these TVs to display a browser window thereon, undesirable problems may occur, in which for example, it takes time to start-up the browser window, the browser window is disturbed, and the like. TVs can be provided with a high-performance processor and install the same operating system (OS) as that for PCs. However, such TVs results in high cost, and users will not welcome them.

DETAILED DESCRIPTION

Embodiments of the present invention will now be explained with reference to the accompanying drawings.

An information output apparatus has:

a first interface to receive an equipment operational signal from a short-range wireless communication apparatus;

a second interface to receive broadcast wave data based on the equipment operational signal;

a third interface to transmit the equipment operational signal to an information generating apparatus;

a fourth interface to receive video data transmitted from the information generating apparatus;

a fifth interface to receive a control command transmitted from the information generating apparatus in response to the equipment operational signal transmitted from the third interface part;

an information superimposing part configured to transmit the equipment operational signal from the third interface part to the information generating apparatus and then to superimpose video data updated by the information generating apparatus and received from the fourth interface part with the broadcast wave data to display the superimposed data on a display part;

a first connection establishing part configured to establish a connection for transmitting the equipment operational signal to the information generating apparatus via the third interface part;

a second connection establishing part configured to establish a connection for receiving video data via the fourth interface part;

a third connection establishing part configured to establish a connection for receiving the control instruction transmitted from the information generating apparatus;

a control command executing part configured to execute the control command received via the fifth interface part; and a connection managing part configured to confirm that the first, second and third connection establishing parts establish connections with the same information generating apparatus.

First Embodiment

Figure 1:
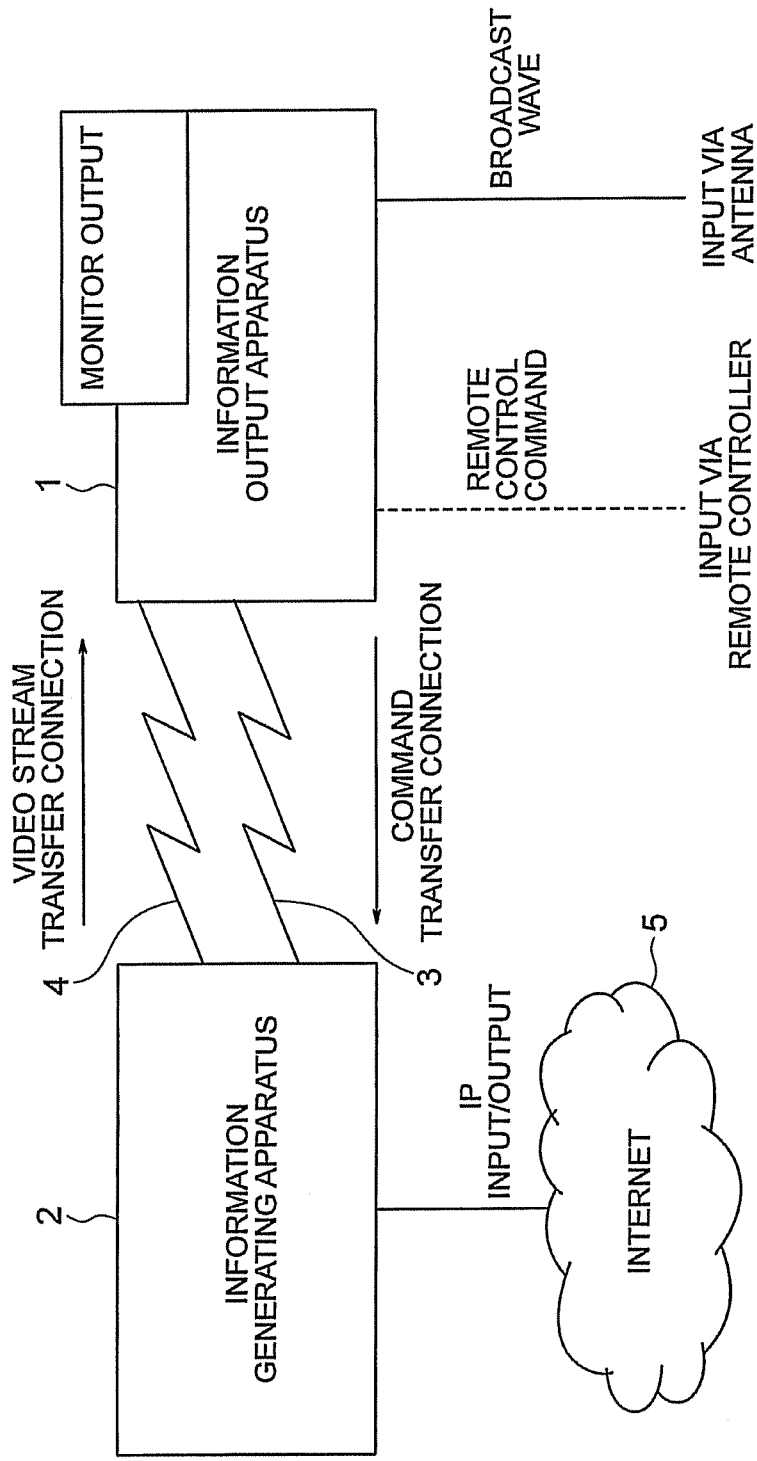
FIG. 1 is a block diagram schematically showing the configuration of an information processing system.

FIG. 1 is a block diagram schematically showing the configuration of an information processing system according to a first embodiment. An information processing system of FIG. 1 is provided with an information output apparatus 1 and an information generating apparatus 2 connected to each other via networks. The information output apparatus 1 is, for example, a digital TV or a recorder. The apparatus 1 is equipped with an interface part for receiving a signal (a remote control command or an equipment operational signal, hereinafter) from a remote controller (or a short-range wireless communication apparatus, hereinafter) and an interface part for receiving broadcast wave data. A display apparatus is built in or connected to the information output apparatus 1. The network for connecting the information output apparatus 1 and the information generating apparatus 2 may be an online or a wireless network. A remote control command transmitted by a remote controller can take a variety of forms such as infrared rays or a radio signal.

The information generating apparatus 2 is general-purpose electronic equipment, such as a PC, a mobile phone, a smart phone, etc. equipped with a high-performance processor. It is assumed that the information generating apparatus 2 starts-up and runs a browser. Therefore, a processor built in the information generating apparatus 2 requires relatively high throughput.

The information output apparatus 1 transmits a remote control command to the information generating apparatus 2 via a network 3. The information generating apparatus 2 generates video data based on the received remote control command and transmits the video data to the information output apparatus 1 via a network 4. The video data may be in the form of stream or packet. Hereinafter, the video data is referred to as a video stream or GUI (Graphical User Interface) data. The video stream used in this embodiment may be still-image data or moving-image data.

As a physical layer and a link layer of the network 3 via which the information output apparatus 1 transmits a remote control command to the information generating apparatus 2, a variety of forms can be adopted, such as infrared rays, wireless LAN in conformity with IEEE802.11, Ethernet (a registered trademark), etc. When internet protocol (IP) is used as a network layer of the network 3, the IP may be IPv4 or IPv6. After a command transfer connection is established, a remote control command is transmitted from the information output apparatus 1 to the information generating apparatus 2 via the network 3.

A physical layer and a link layer of the network 4 via which the information generating apparatus 2 transmits a video stream to the information output apparatus 1 may be the transmission of non-compressed video stream such as HDMI (High-Definition Multimedia Interface) or WirelessHD. Or the information generating apparatus 2 encodes the stream into a compressed video stream to transmit it, and the information output apparatus 1 may decode the compressed video stream. The network between the information output apparatus 1 and the information generating apparatus 2 may be a wireless LAN, Ethernet, HDMI-HEC (HDMI Ethernet Channel), etc. When internet protocol (IP) is used as a network layer of the network, the IP may be IPv4 or IPv6. Moreover, when the internet protocol is used, a router (not shown) may be connected between the information output apparatus 1 and the information generating apparatus 2. After a video stream transfer connection is established, a video stream is transmitted from the information generating apparatus 2 to the information output apparatus 1 via the network 4.

Hereinbelow, as one example, the Internet protocol is used for transmission of a remote control command from the information output apparatus 1 to the information generating apparatus 2 and HDMI 1 is used for transmission of a video stream from the information generating apparatus 2 to the information output apparatus 1.

Here, the remote control command is a command selected by depressing a cross-key button, an enter button, a return button, a channel button, channel up-down button, a volume button, etc. provided, for example, on a remote controller of a digital TV.

The information output apparatus 1 has a function of decoding and displaying video contents (broadcast wave data) received by an antenna (not shown), that is a TV viewing function. In this example, a video stream received from the information generating apparatus 2 and broadcast wave data received via an antenna or the like and decoded by the information output apparatus 1 are displayed on the same screen.

Figure 2:
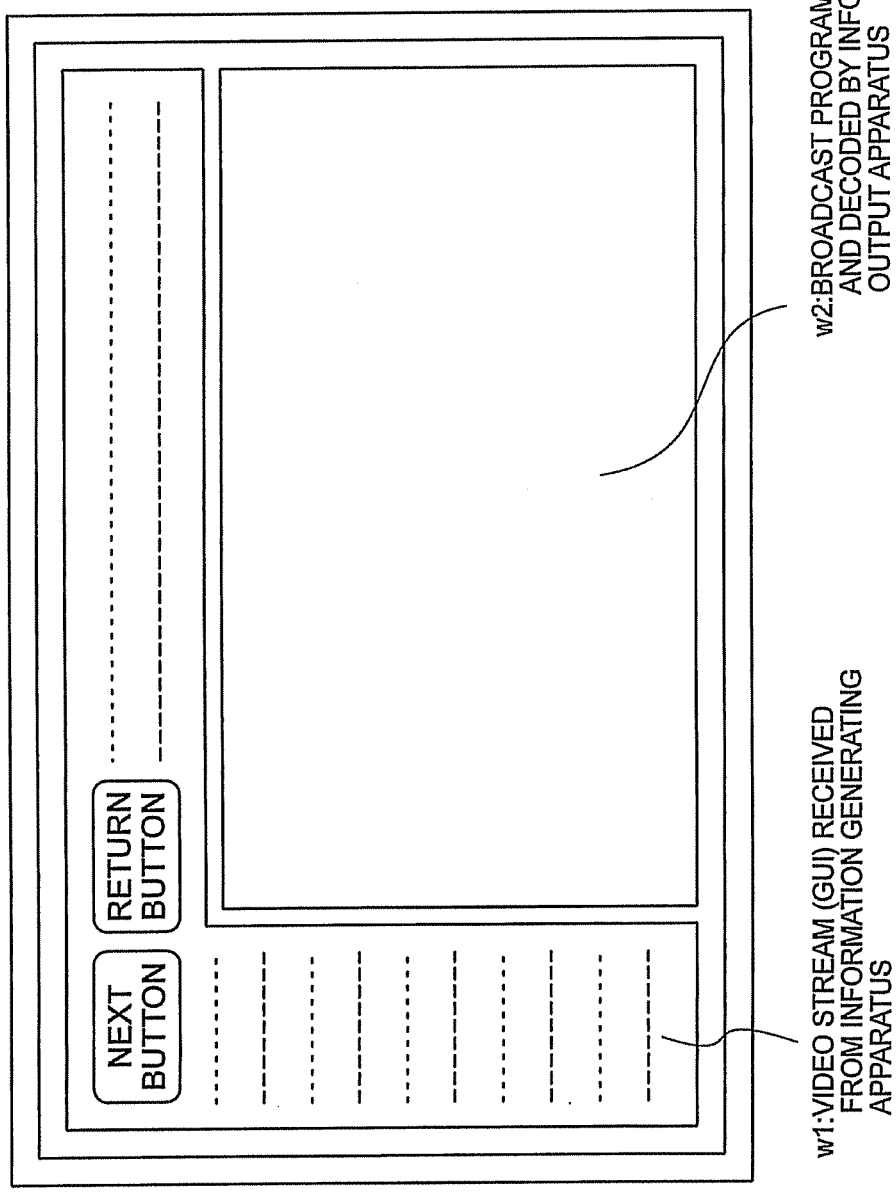
FIG. 2 a view showing an example of a window on a display part of an information output apparatus 1.

FIG. 2 is a view showing an example of a screen on a display part of the information output apparatus 1. The display part may be built in the information output apparatus 1 or separated therefrom and connected thereto. Provided on lower right of the screen shown in FIG. 2 is a window w1 for displaying broadcast wave data. Provided around the window w1 is a window w2 for displaying a video stream (GUI data) generated by the information generating apparatus 2. Even still-image data, such as an image of a button or character information, is encoded into moving-image data and transmitted from the information generating apparatus 2 to the information output apparatus 1 as a video stream.

The information generating apparatus 2 has an IP interface part for communicating with a server (not shown) via Internet 5, separately from connection for communicating with the information output apparatus 1. As a physical layer and a link layer of the IP interface part, a variety of forms can be adopted, such as wireless LAN or Ethernet in conformity with IEEE802.11. When Internet protocol (IP) is used as a network layer, the IP may be IPv4 or IPv6.

Figure 3:
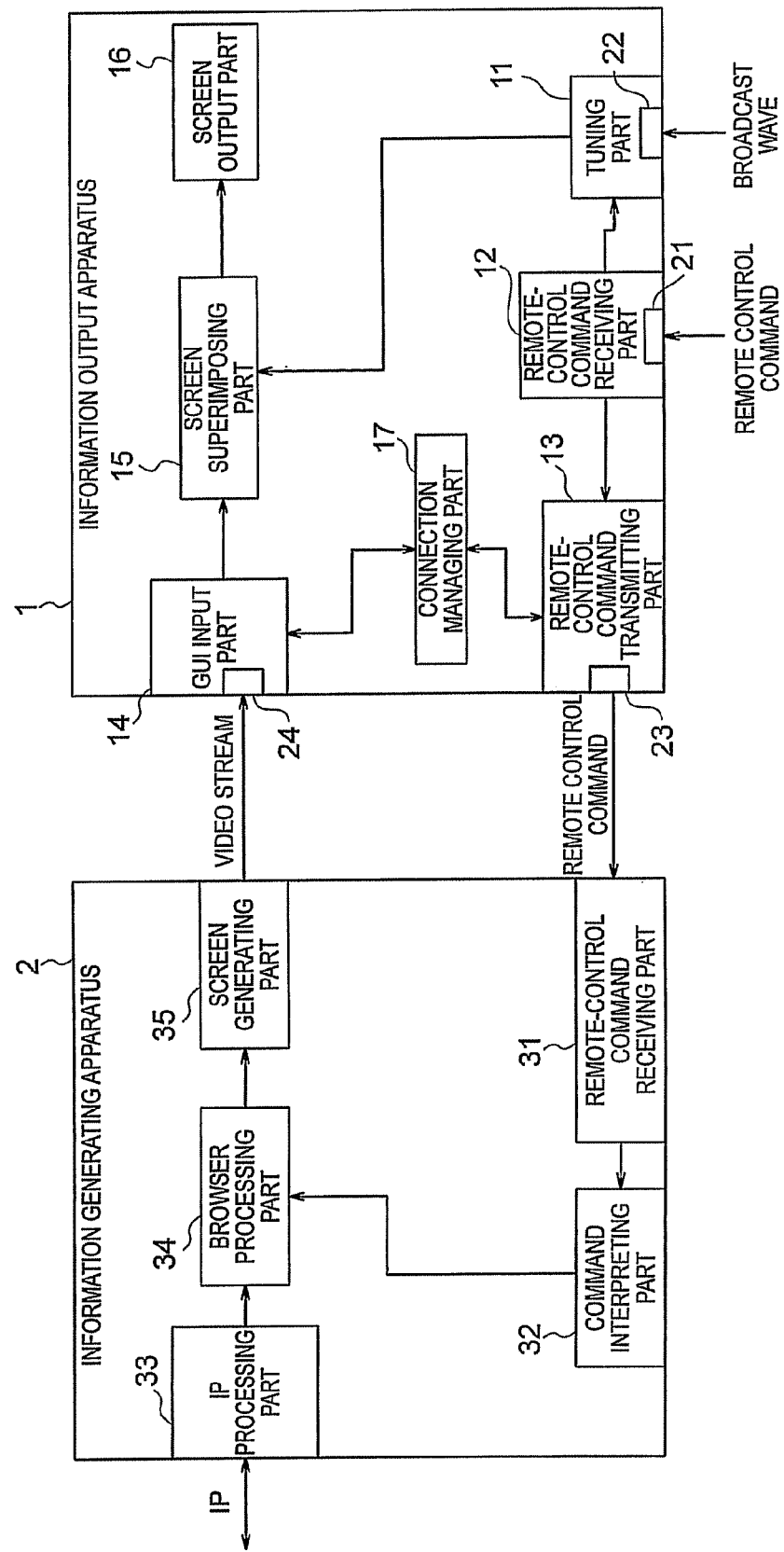
FIG. 3 is a block diagram of the information processing system.

FIG. 3 is a block diagram of the information processing system, showing in detail the internal configurations of the information output apparatus 1 and the information generating apparatus 2 of FIG. 1. The information output apparatus 1 of FIG. 3 has a tuning part 11, a remote-control command receiving part 12, a remote-control command transmitting part 13, a GUI input part 14, a screen superimposing part 15, a screen output part 16, and a connection managing part 17.

The tuning part 11 extracts a broadcast program or broadcast-related information from broadcast wave data received via an antenna or the like and performs demuxing and decoding processes to the broadcast program or broadcast-related information. The remote-control command receiving part 12 receives a remote control command received from a remote controller (not shown) via an interface part such as infrared rays. The remote-control command transmitting part 13 transmits the command received at the remote-control command receiving part 12 to the information generating apparatus 2.

The GUI input part 14 performs a process of receiving video stream (GUI data) transmitted from the information generating apparatus 2. The GUI input part 14 also performs a decoding process when the received video stream has been compressed. The screen superimposing part 15 superimposes broadcast contents demodulated by the tuning part 11 and a video stream received by the GUI input part 14 to generate a GUI screen such as shown in FIG. 2. The screen output part 16 supplies video data generated by the screen superimposing part 15 to the display part.

FIG. 2 shows an example of generating video data related to a broadcast program. However, instead of broadcast contents demodulated by the tuning part 11, externally-input contents provided by an external apparatus (not shown) via HDMI and a video stream from the information generating apparatus 2 may be superimposed. Or contents stored in a storage part (not shown) in the information output apparatus 1 and a video stream may be superimposed.

The connection managing part 17 confirms whether a communication partner of the remote-control command transmitting part 13 and that of the GUI input part 14 are the same one.

When the remote-control command transmitting part 13 and the remote-control command receiving part 12 are disconnected or the GUI input part 14 and a screen generating part described below are disconnected, the connection managing part 17 performs a process of sending a message of the disconnection to a user. The reason for sending such a message is that, for example, when the remote-control command transmitting part 13 and the remote-control command receiving part 12 are disconnected while the screen generating part and the GUI input part 14 are connected, a remote control command cannot be transferred to the information generating apparatus 2, resulting in video stream being not updated. In more practically, even if a user depresses a return button of the remote controller on a screen such as shown in FIG. 2, errors may occur in which the screen does not transit normally. Accordingly, the connection managing part 17 performs a process of detecting such errors. Incidentally, the connection managing part 17 is not an essential element.

In addition, the information output apparatus 1 of FIG. 3 has a first interface part 21, a second interface part 22, a third interface part 23, a fourth interface part 24, a first connection establishing part, and a second connection establishing part.

The first interface part 21 receives an equipment operational signal from a remote controller. The second interface part 22 receives broadcast wave data based on a remote control command. The third interface part 23 transmits a remote control command to the information generating apparatus 2. The fourth interface part 24 receives video data transmitted from the information generating apparatus 2.

The first connection establishing part establishes a connection for transmitting a remote-control command to the information generating apparatus 2 via the third interface part 23. The second connection establishing part establishes a connection for receiving video data via the fourth interface part 24. The first and second connection establishing parts are usually implemented with software, and hence not shown in FIG. 3.

The first connection establishing part is implemented, for example, with software that runs on the third interface part 23. The second connection establishing part is implemented, for example, with software that runs on the fourth interface part 24.

When the connection with the information generating apparatus 2 is cut off, the first or the second connection establishing part may detect the disconnection and may notify the connection managing part 17 of the disconnection, and then the connection managing part 17 may establish again the connection or notifies a user with a message on a screen a message that indicates the disconnection.

The information generating apparatus 2 of FIG. 3 has a remote-control command receiving part 31, a command interpreting part 32, an IP processing part 33, a browser processing part 34, and a screen generating part 35.

The remote-control command receiving part 31 receives a remote control command transmitted from the information output apparatus 1. The command interpreting part 32 interprets the remote control command received at the remote-control command receiving part 31 as to what type of command it is. The IP processing part 33 acquires a GUI file (referred to as a resource file, hereinafter) that is described in HTML, JavaScript, etc. from an Web server (not shown) on the Internet or a local network via a network interface part.

The browser processing part 34 interprets the resource file acquired by the IP processing part 33 and generates GUI data in accordance with commands described in the resource file. Instead of input from the IP processing part 33, resource files may be stored in a storage part (not shown) that is a flash memory or the like in the information generating apparatus 2. In this case, the browser processing part 34 loads resource files from the storage part according to need and generates GUI data.

Screen transition of GUI data generated by running a resource file is achieved by loading a new resource file based on link information (URL) embedded in an HTML file or a JavaScript file. For example, in the GUI screen shown in FIG. 2, when a "next button" is selected, the browser processing part 34 loads a new resource file based on a link (URL) pointed out by the "next button" and generates new GUI data. An instruction to the browser processing part 34, such as depressing the "next button", depressing a "return button" or shifting a focus of the button, are performed by the command interpreting part 32 in accordance with the type of a remote control command received from the information output apparatus 1.

The screen generating part 35 performs a process of transmitting GUI data generated by the browser processing part 34 to the information output apparatus 1 as a video stream. In this process, a compression process may be performed to the video stream in accordance with a network interface.

As described above, the information output apparatus 1 instructs the information generating apparatus 2 as to what kind of video stream it has to generate. In accordance with the instruction, the information generating apparatus 2 performs a process of generating a video stream based on a resource file acquired from the network server via the IP network. The information generating apparatus 2 transmits the video stream as a video stream to the information output apparatus 1. The information output apparatus 1 superimposes the video stream generated by the information generating apparatus 2 and broadcast contents to draw the superimposed image on the display part.

In the above explained example, the browser processing part 34 generates a video stream using a resource file received from the network server or a resource file stored in the storage part (not shown) in the information generating apparatus 2. Instead of that, a video stream may be generated using both of a resource file received from the network server and a resource file stored in the storage part.

In the above example, an HTML file and a JavaScript file are used as examples of a resource file. Not only these files, but also files described in other languages (HTML5, Java, etc.) may be used. Moreover, an OS- or CPU-dependent application language may be used.

(Set-Up Phase)

In order for the information output apparatus 1 and the information generating apparatus 2 to communicate with each other with several types of information, it is required to establish a connection by performing a specific set-up process between the apparatuses. A set-up process to be performed between the information output apparatus 1 and the information generating apparatus 2 will be explained below.

As described above, the information generating apparatus 2 and the information output apparatus 1 of FIG. 3 have the first connection establishing part for transmitting and receiving a remote control command and the second connection establishing part for transmitting and receiving a video stream.

A process to be performed in the set-up process is the determination of combination of an information output apparatus 1 and an information generating apparatus 2 to establish a connection each other. Explained below is a process of the determination of combination of one information output apparatus 1 and one information generating apparatus 2 to establish a connection each other. However, a plurality of information output apparatuses 1 may be connected to one information generating apparatus 2.

There are following three types of techniques for establishing a connection by means of the first and second connection establishing parts between the information output apparatus 1 and the information generating apparatus 2.

(1) A connection is established by means of the remote-control command transmitting part 13 and the remote-control command receiving part 31.

(2) A connection is established by means of the GUI input part 14 and the screen generating part 35.

(3) A connection is independently set at the information output apparatus 1 and the information generating apparatus 2.

In the case of (1), the information output apparatus 1 and the information generating apparatus 2 establish a connection of the first connection establishing part for transmitting a remote control command before connection establishment of the second connection establishing part for transmitting a video stream. Explained here is that TCP/IP is used as a remote-control command transfer connection.

A known technique such as UPnP Discovery protocol may be used as a means for searching for the information generating apparatus 2 among a plurality of pieces of equipment that exist on a network. A user selects the information generating apparatus 2 among a plurality of pieces of equipment found and connects it to an IP address and a port number acquired via the UPnP Discovery protocol, to establish a remote-control command transfer connection. Instead of this, as a technique to establish a remote-control transfer connection, IP addresses and port numbers may be preset to the information output apparatus 1, and may be specify to establish the connection.

Next, the second connection establishing part establishes a connection for transmitting a video stream. Explained below is an example in which HDMI is used for transferring a video stream. The information generating apparatus 2 searches for its own HDMI port that is connected to the information output apparatus 1. The information output apparatus 1 searches for its own HDMI port to which the information generating apparatus 2 is connected. The information generating apparatus 2 or the information output apparatus 1 may be provided with a plurality of HDMI ports. In this case, there are techniques for correctly establishing a video stream transfer connection. One is to notify an ID of its own HDMI, its own name or identifier to a communication partner via a remote-control command transfer connection and then connect the communication partner to the corresponding HDMI port. Another is to transfer a list of IDs, names or identifiers of communication partners to which its own HDMI is connected, and its own ID, name or identifier via a remote-control command transfer connection and then, if there is an ID, a name or an identifier corresponding to a communication partner, the communication partner activates the HDMI port for establishing a connection.

When connection establishment is successful at the second connection establishing part for transmitting a video stream, the success of establishment of the second video stream transfer connection may be informed a communication partner by using the first remote-control command transfer connection. If there is only one HDMI port for the information generating apparatus 2 or the information output apparatus 1, the searching process described above may be omitted.

In the case of (2), the second video stream transfer connection is established first. The establishment may be allow the information generating apparatus 2 to select which HDMI port is output to the screen output part 16, or to select which HDMI port is input. Or dedicated HDMI port provided only for use in connection with the information generating apparatus 2 may be selected. Thereafter, information (an IP address and a port number) on the first connection (TCP/IP connection) for transmitting and receiving a remote control command is transferred (for example, with a technique of HDMI-HEC, HDMI CEC (HDMI Consumer Electronics Control), etc. for HDMI) by means of the second video stream transfer connection, to establish the first connection (TCP/IP connection) for transmitting a remote control command. When the establishment of the first remote-control command transfer connection is succeeded, the success may be informed by means of the second video stream transfer connection.

In the case of (3), the second video stream transfer connection and the first remote-control command transfer connection is manually set by a user with a setting application or the like. Or the second and first connections may be preset at the information output apparatus 1 and the information generating apparatus 2 at the time of shipping.

When the second video stream transfer connection is established, an authentication key exchange process may be performed for protecting the copyright of contents. A well-known technique can be used for the authentication key exchange process.

When any of the connections is established, the information output apparatus 1 may transmit parameters on a monitor such as the resolution and the size of a generated screen to the information generating apparatus 2.

Moreover, when the information generating apparatus 2 compresses and transmits GUI data to be transferred over the second video stream transfer connection, the information output apparatus 1 and the information generating apparatus 2 may have a negotiation on the compression system and format for transmission and reception, over the first remote-control command transfer connection or the second video stream transfer connection.

In the example described above, HDMI and IP are used as the second video stream transfer connection and the first remote-control command transfer connection, respectively, although not limited to those as explained below.

The second video stream transfer connection and the first remote-control command transfer connection may, for example, be established with the same physical connection. For example, when HDMI-HEC, HDMI-CEC, and wireless LAN are used, the connection for transferring both of a video stream and a remote control command can be established with the same physical connection. In this case, it is firstly confirmed that the information output apparatus 1 and the information generating apparatus 2 have been connected to each other by means of a HDMI signal, to establish a video stream transfer connection. And then, the information output apparatus 1 and the information generating apparatus 2 are connected at a specific IP address and port number acquired by UPnP Discovery protocol or the like, to establish a remote-control command transfer connection. Likewise, when wireless LAN is used, it is confirmed at a layer of the wireless LAN or an IP layer that the information output apparatus 1 and the information generating apparatus 2 have been connected to each other, to establish connections for transferring a video stream and a remote control command, respectively, by using different TCPs or UDP ports.

(Use Phase: Operation of GUI Data Through Remote Control Command)

Figure 4:
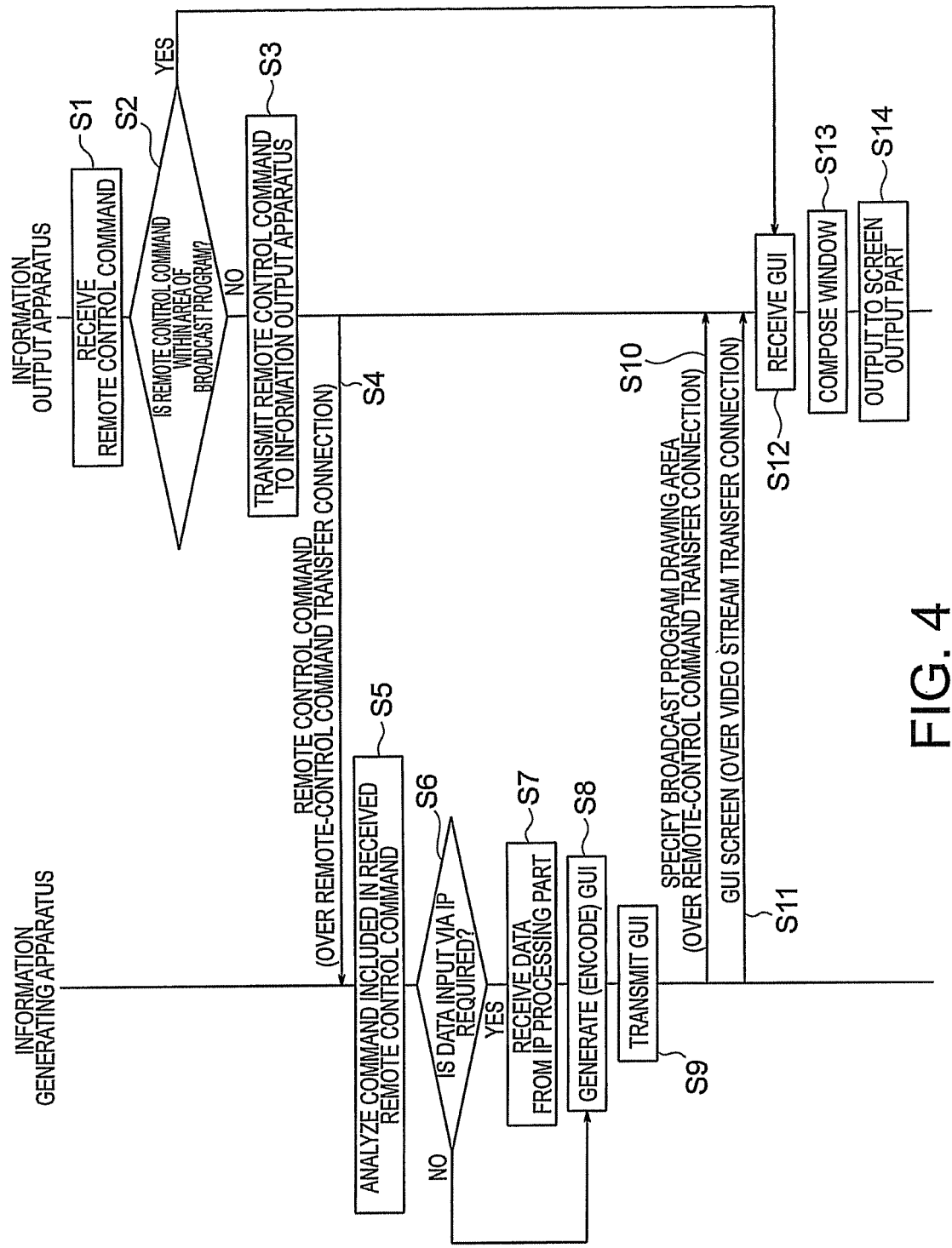
FIG. 4 is a sequence diagram showing an example of process steps.

Explained next are process steps of transferring a remote control command and a video stream by means of the information output apparatus 1 and the information generating apparatus 2 of FIG. 3, respectively. FIG. 4 is a sequence diagram showing an example of the process steps. Explained first is an example of operating a GUI screen through a remote control command. It is assumed that the information output apparatus 1 draws only broadcast contents input from the tuning part 11 on the screen output part 16, as an initial screen. In this case, a process will be explained below in which a user uses a remote controller to switch into a mode of superimposing the broadcast contents and a video stream received from the information generating apparatus 2 of FIG. 3.

When mode switching occurs, the information output apparatus 1 determines an area for drawing a broadcast program such as shown in FIG. 2 and an area for drawing a video stream generated by the information generating apparatus 2. As for techniques for determining the drawing areas, there are a technique in which the information output apparatus 1 makes determination by itself and another technique in which the information generating apparatus 2 notifies the information output apparatus 1 of the drawing areas.

When the information output apparatus 1 makes determination by itself, it determines an area (window) of GUI data generated by the information generating apparatus 2 and that of a broadcast program each as a fixed value, as the screen shown in FIG. 2. The ratio of size between the areas of GUI data and a broadcast program may of course be varied by an enlarging key on the remote controller or the like. Or a window size, a drawing location (a drawing location of GUI data or a broadcast program, or both), an aspect ratio, resolution, etc. for GUI data to be generated may be informed from the information output apparatus 1 to the information generating apparatus 2 over the remote-control command transfer connection.

As for the technique in which the information generating apparatus 2 notifies the information output apparatus 1 of the drawing areas, there are techniques to transmit a drawing area for a window of a broadcast program or GUI data each time in response to a remote control command, to notify only when the area is changed, etc. It may be performed to correctly specify the drawing location and area, and overlay a broadcast-program drawing area on GUI data to generate a screen that shows as if a broadcast program is embedded in GUI data. In this case, the information generating apparatus 2 generates GUI data at a screen size suited for the information output apparatus 1, generates GUI data by which nothing is to be drawn in the area in which a broadcast program is to be embedded, and transmits the data to the information output apparatus 1.

In the case of input of mode switching, there are several techniques for acquiring a resource file, such as an HTML file or JavaScript, for composing GUI data. (1) A technique is using a resource file prestored in a storage part (not shown) of the information generating apparatus. (2) Another technique is that a location (URL) of a resource file is prestored in a storage part (not shown) of the information generating apparatus 2, the information generating apparatus 2 acquires a resource file from the URL. (3) Still another technique is that a location (URL) on a network of a resource file is prestored in a storage part (not shown) of the information output apparatus 1, and the information output apparatus 1 transfers the URL to the information generating apparatus 2 and then the information generating apparatus 2 acquires a resource file from a location specified by the URL. The URL may be overwritten by a means such as firmware update.

Figure 5:
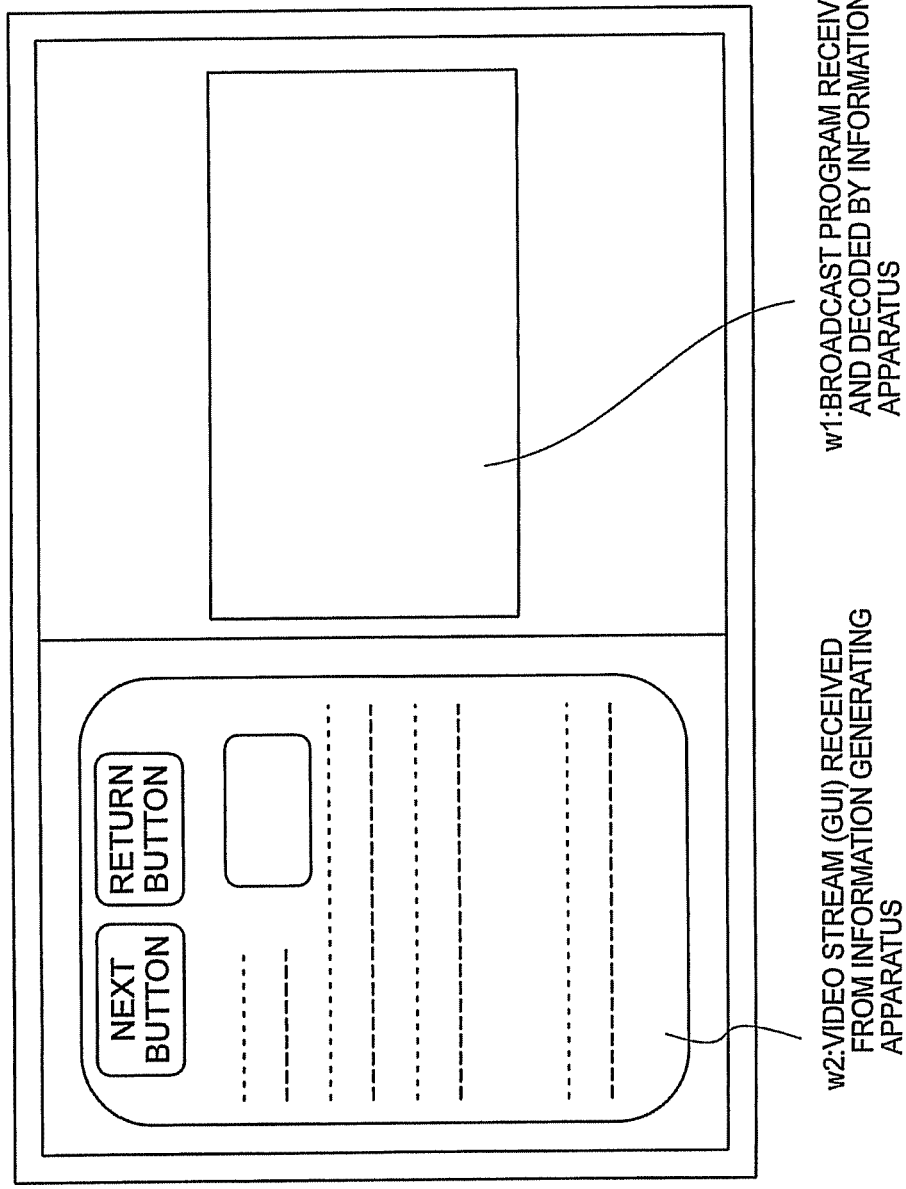
FIG. 5 a view showing an example of a window on the display part of the information output apparatus 1.

When a user operates a remote controller under the condition that a screen such as shown in FIG. 2 or 5 is displayed, the remote-control command receiving part 12 in the information output apparatus 1 receives a remote control command (step S1) and determines whether the remote control command is related to the drawing area for a broadcast program shown in FIG. 2 or 5 (step S2).

The information output apparatus 1 may perform a process of determining whether a cursor is located in the area of a broadcast program or GUI shown in FIG. 2. In this process, if it is determined that a cursor is located in the area of a broadcast program shown in FIG. 2, a remote control command is not transmitted to the information generating apparatus 2. Only if a cursor is located in the GUI area, a remote control command is transmitted to the information generating apparatus 2.

There is a case where a remote controller is a device such as a mouse by which a cursor can be moved freely, instead of a cross key, ten key, etc. In this case, the information output apparatus 1 may perform a determination process to find the location on which a button is depressed. In this process, if it is determined that it is located in the area of a broadcast program, the information output apparatus 1 does not transmit a button depressing command to the information generating apparatus 2. Only if it is determined that a cursor of the mouse is located in the GUI area, the information output apparatus 1 transmits the button depressing command to the information generating apparatus 2.

When a remote control command is not related to the drawing area for a broadcast program but for a video stream generated by the information generating apparatus 2, the remote control command is transmitted from the information generating apparatus 2 (step S3). In more detail, the remote control command is converted into a format for use in transmission over the remote-control command transfer connection and transmitted to the information output apparatus 1 (step S4).

As a technique in which the information output apparatus 1 transmits a remote control command, a TCP/IP connection may be established between the remote-control command transmitting part 13 and the remote-control command receiving part 31, to encapsulate a remote control command on the TCP. Moreover, if the information generating apparatus 2 is equipped with a Web server function, an HTTP connection between the remote-control command transmitting part 13 and the remote-control command receiving part 31, to transmit a remote control command after including the command in an HTTP header or after encoding the command into a URL.

When the information generating apparatus 2 receives a remote control command at the remote-control command receiving part 31, the command interpreting part 32 interprets the remote control command (step S5). With a result of interpretation of the remote control command, the information generating apparatus 2 determines whether it is required to acquire data from a Web server or the like (step S6).

When it is required to acquire data, the information generating apparatus 2 acquires data from the IP processing part 33 (step S7) and generates a video stream (step S8). Suppose that information selected by a cursor exists on a GUI hyperlink and a received remote control command is "a command indicating that an enter button has been depressed". In this case, the information generating apparatus 2 acquires a resource file (an HTML file, JavaScript, image or text data, etc.) at a URL indicated by the hyperlink from a server on the Internet or a local area network, to generate a video stream. Thereafter, the video stream generated by the information generating apparatus 2 is transmitted to the information output apparatus 1 with compression or non-compression (step S9). A video stream generated by the information generating apparatus 2 is transmitted to the information output apparatus 1 as a video stream including a video stream even if it is still-image data such as a window.

In transmission of a video stream to the information output apparatus 1, the information generating apparatus 2 can indicate a drawing area for a broadcast program to be displayed on a display screen of the information output apparatus 1 (step S10). This indication is transmitted to the information output apparatus 1 in response to a remote control command by using the remote-control command transfer connection. A video stream is transmitted to the information output apparatus 1 by using the video stream transfer connection (step S11).

When a moving image is included in data received via a network, or a moving image is included in GUI data, the moving image is decoded once and other GUI data such as text information is included in the decoded moving-image data so that the entire window of a browser becomes a video stream which is then transferred to the information output apparatus 1. In this case, the video stream may be compressed with MPEG, H.264, etc., or may be transmitted without compression. The information output apparatus 1 receives GUI data, draws the GUI data and a broadcast program on respective window areas it specified or the information generating apparatus 2 specified, and then outputs a combined window to the display part.

On receiving a video stream from the information generating apparatus 2 (step S12), the information output apparatus 1 generates a GUI screen that is a combination of the video stream and a broadcast program (step S13) and outputs it to the screen output part 16 (step S14).

On the contrary, if it is determined in step S2 that the remote control command is related to a broadcast program, the information output apparatus 1 receives a video stream from the tuning part 11 and then performs step S12 and the following steps.

In the example described above, the information output apparatus 1 determines whether a remote control command is related to the drawing area for a broadcast program shown in FIG. 2 or FIG. 5 and transmits the remote control command to the information generating apparatus 2 only when the remote control command is not related to the drawing area. However, the information output apparatus 1 may transmit a remote control command to the information generating apparatus 2 without the determination and the information generating apparatus 2 may determine whether the remote control command is related to the drawing area for a broadcast program and may execute the command only when the command is not related to the drawing area.

By providing the above-described information output apparatus 1 and the information generating apparatus 2, even if a Web browser is not installed in the information output apparatus 1, a Web page composed of an HTML file, JavaScript, etc. can be browsed on the information output apparatus 1 by generating GUI data at the information generating apparatus 2. Moreover, even if the information output apparatus 1 is not connected to the Internet, if the information generating apparatus 2 can be connected to the Internet, not only broadcast contents but also Internet contents can be displayed on the display screen of the information output apparatus 1, thus improving user-friendliness. In particular, high-performance processes have to be implemented in a Web browser, like interpretation of JavaScript and the like. Accordingly, the example described above is very useful for the case where the information output apparatus 1 is an equipment, such as a TV, having low throughput and a low browser rendering speed and the information generating apparatus 2 is an equipment, such as a PC or a mobile phone, having a network connection function and a high browser rendering speed.

Furthermore, in this configuration, a user operates a window by using a remote controller of the information output apparatus 1. Conventionally, if the information output apparatus 1 (for example, a TV) is not equipped with a Web browser, in order to enjoy both of broadcast contents and a Web browser, a user has to browse in a window of a Web browser on the information generating apparatus 2 while enjoying broadcast contents on the information output apparatus 1. That is, conventionally, it is impossible to display both of a Web browser and broadcast contents on a single screen. According to the present embodiment, however, a user can browse in and operate a browser window while enjoying viewing broadcast contents only on the display screen of the information output apparatus 1, thus remarkably improving usability.

In the example described above, the information generating apparatus 2 switches a video stream with a remote control command received by the information output apparatus 1 as a trigger. However, the information generating apparatus 2 may switch a video stream without a remote control command as a trigger. For example, one is assumed that an application that runs on the browser processing part 34 of the information generating apparatus 2 periodically acquires a resource file via the IP processing part 33. In this case, when a newly received resource file (for example, an image file) changes, the browser processing part 34 reconfigures the switched resource file and then the screen generating part 35 generates a video stream and transfers it to the information output apparatus 1 by using the video stream transfer connection. In the information output apparatus 1, the screen superimposing part 15 superimposes the new video stream and contents from the tuning part 11, and the superimposed GUI screen is then output from the screen output part 16.

This configuration is particularly useful for a video stream ("a video stream received from the screen generating part 35" shown in FIG. 3) that includes video data. For example, a service for distributing moving images via the Internet has been popular recently. When an moving image file is included in a resource file such as HTML, JavaScript, etc., the screen generating part 35 generates a window including the moving image file. Accordingly, both of video data received by the information generating apparatus 2 and broadcast contents received by the tuning part 11 can be simultaneously included in a GUI screen output by the screen generating part 35.

Generally, a decoder is required to playback video data (it is assumed in FIG. 2 that the tuning part 11 has a decoder). The number of video data simultaneously being able to be playbacked is restricted previously, depending on the processing performance of a decoder, in general. However, in this embodiment, decoding of video data received from the Internet is performed by the information generating apparatus 2. Accordingly, even if the information output apparatus 1 has only one decoder for decoding broadcast contents, the information generating apparatus 2 decodes video data received from the Internet. Therefore, this embodiment can provide a window displayed on which for a user are two or more of moving images which are shown as if playbacked by the information output apparatus 1. Moreover, if the decoder in information generating apparatus 2 is implemented by software, playback is possible with a variety of Codec. With updating the software of the information generating apparatus 2, a moving image compressed by a new Codec can be provided to a user, with no modification to the information output apparatus 1.

(Use Phase: Operation such as Channel Selection with Remote Controller)

Explained below is an example in which the tuning part 11 of the information output apparatus 1 is operated by a remote controller. It is assumed as an initial state that the information output apparatus 1 is displaying a screen (a video stream and a broadcast program) such as shown in FIG. 2. In this state, tuning is performed at the tuning part 11 in accordance with a remote control command. On receiving a tuning command to the tuning part 11, the remote-control command receiving part 12 of the information output apparatus 1 instructs the tuning part 11 to be tuned to a channel. Then, the tuning part 11 performs a process of tuning in accordance with the instruction and transmits a newly selected broadcast program to the screen superimposing part 15.

The remote-control command receiving part 12 also transmits a remote control command including the tuning command to the tuning part 11 to the remote-control command transmitting part 13. The remote-control command transmitting part 13 converts the remote control command into a data format for transmission over the remote-control command transfer connection and transmits the converted remote control command to the information generating apparatus 2. The converted remote control command may include area information that indicates an area from which the information output apparatus 1 is receiving a broadcast wave, and the like.

On receiving a remote control command at the remote-control command receiving part 31, the information generating apparatus 2 interprets the remote control command at the command interpreting part 32. When the remote control command includes a channel number that indicates a channel the tuning part 11 has been tuned to, the command interpreting part 32 can know the tuned channel.

Next, the information generating apparatus 2 notifies a server (not shown) of channel information that includes the selected channel. A technique of notification to the server is to transmit an HTTP message (an HTTP GET request or an HTTP PUT request) via the IP processing part 33, by means of the browser processing part 34 as described below.

Example in which tuning information is notified as a parameter of a URL of an HTTP GET request GET /index.html?CHANNEL=8 HTTP/1.1

Example in which tuning information is notified as an HTTP header of an HTTP GET request GET /index.html

CHANNEL: 8

The server can be provided with a database containing pairs of a channel number and program information concerning programs now on air. Then, the server responds information depending on program information on a channel in response to the notification of channel information from the information generating apparatus 2. The information depending on program information may be those on actors who appear on a program, related programs, etc. The information generating apparatus 2 receives those information as an HTTM/JavaScript resource file and composes the resource file into a browser screen at the browser processing part 34. Thereafter, like the example of operating GUI data with a remote control command, a screen drawn by the browser processing part 34 is transferred to the information output apparatus 1 as a video stream.

Figure 6:
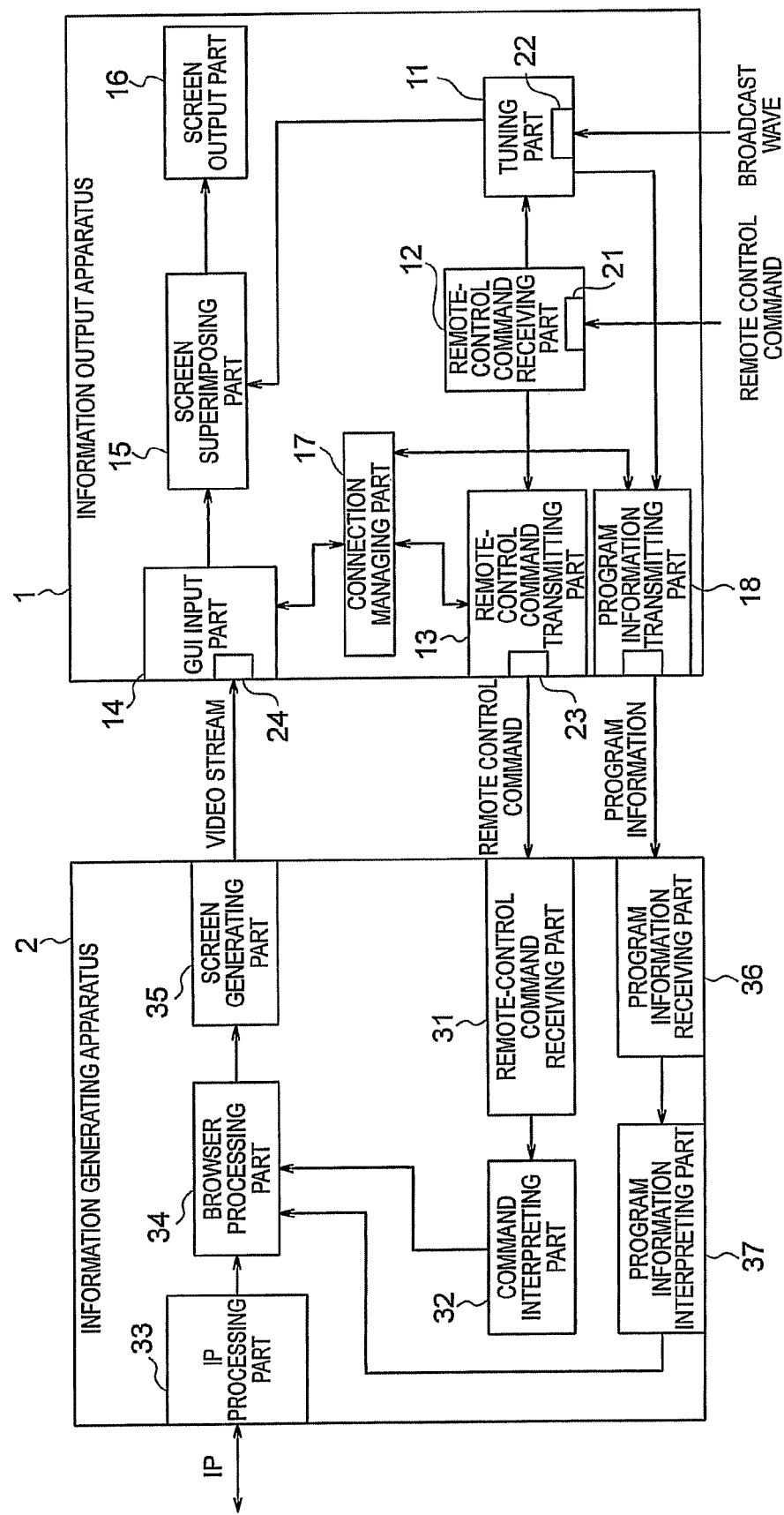
FIG. 6 is a block diagram of an information processing system, showing a modification to FIG. 3.
Figure 7:
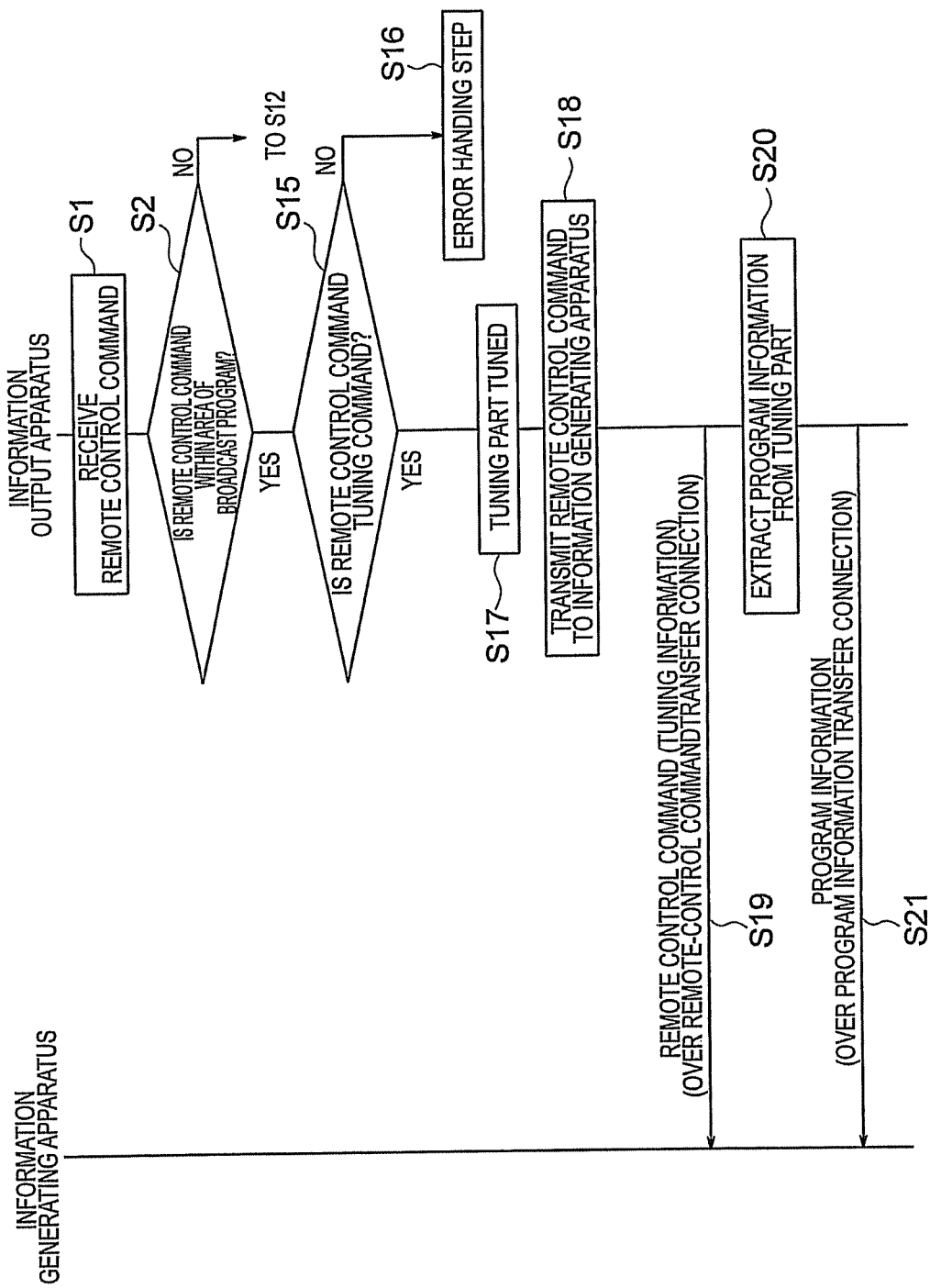
FIG. 7 is a sequence diagram showing an example of process steps of the information processing system of FIG. 6.
Figure 8:
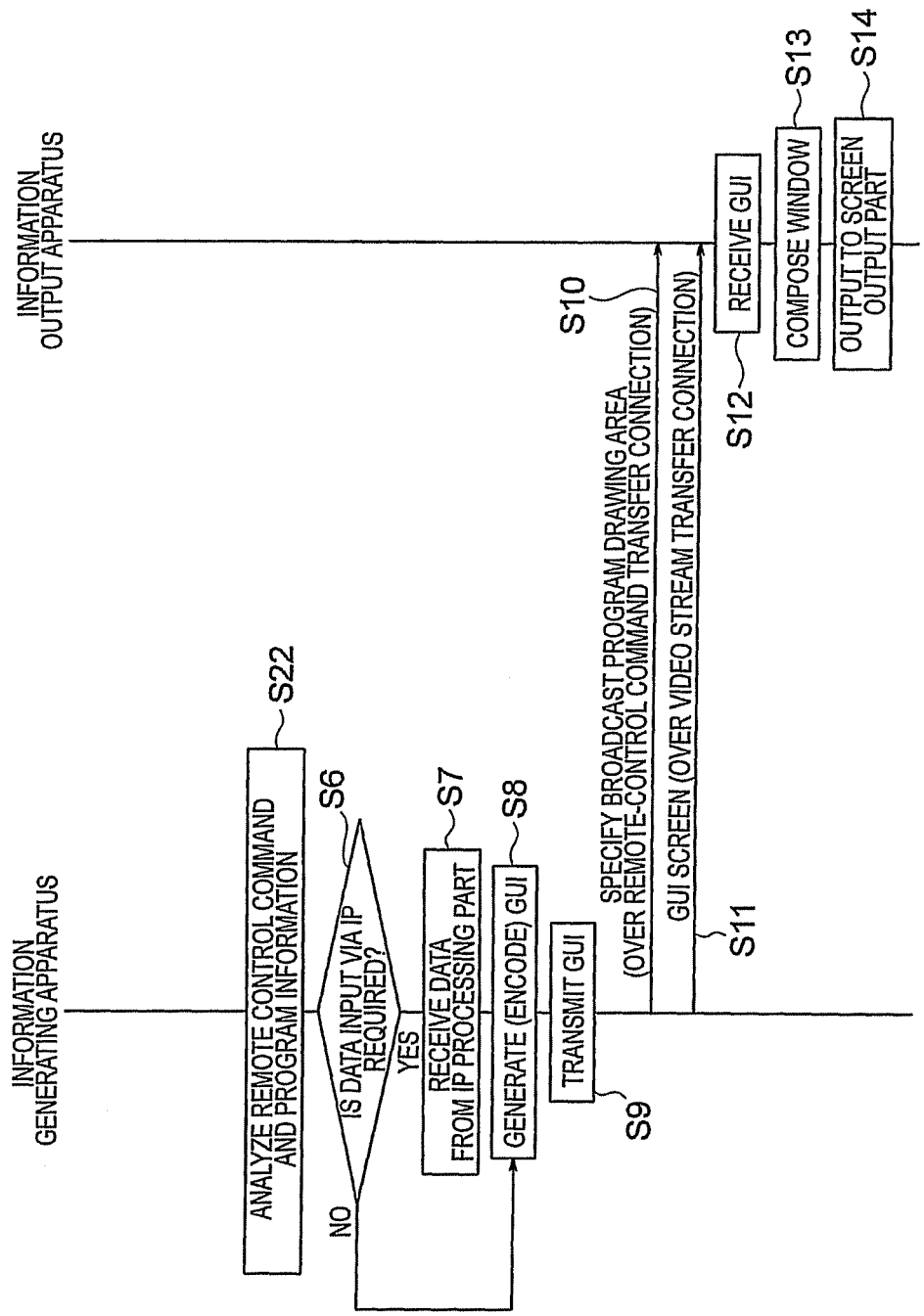
FIG. 8 is a sequence diagram following to FIG. 7.

In the example described above, only a channel number is transmitted over the remote-control command transfer connection. However, by using a connection different from the remote-control command transfer connection, only program information accompanying audio, broadcast contents, etc. of a program on a channel to which the tuning part 11 of the information output apparatus 1 is tuned may be extracted and output to the information generating apparatus 2. The internal configuration of the information processing system in this case is shown in FIG. 6. The difference of FIG. 6 from FIG. 3 is that the information output apparatus 1 has a program information transmitting part 18 and the information generating apparatus 2 has a program information receiving part 36 and a program information interpreting part 37. FIGS. 7 and 8 are sequence diagrams showing an example of process steps of the information processing system of FIG. 6. In FIG. 7, the steps common to FIG. 4 are given the same step numbers.

In step S2, if it is determined that a remote control command is not related to a broadcast program, the same steps as FIG. 4 (the steps S3 and the succeeding steps in FIG. 4) are performed, hence the explanation is omitted.

On the contrary, in step S2, if it is determined that the remote control command is related to a broadcast program, it is determined whether the remote control command is a tuning command to the tuning part 11 (step S15). If the determination is negative, an error handling step is performed (step S16).

If the remote control command is a tuning command to the tuning part 11, the tuning part 11 performs tuning in accordance with the tuning command (step S17). Thereafter, a remote control command including tuning information is transmitted to the information generating apparatus 2 (step S18). In this case, a remote control command including tuning information is transmitted over the remote-control command transfer connection (step S19).

Next, program information (including audio and video data) extracted by the tuning part 11 is acquired (step S20). The acquired program information is transmitted to the information generating apparatus 2 over the program information transfer connection (step S21).

When program information is transmitted and received, the program information may be protected and transferred with a known technique so that the program information cannot be copied illegally or viewed without permission between the information output apparatus 1 and the information generating apparatus 2. Practically, authentication-key exchange may be performed between the information generating apparatus 2 and the information output apparatus 1 to transmit program information encrypted with a key obtained by the authentication-key exchange.

The information generating apparatus 2 receives the program information at the program information receiving part 36 and analyzes information included in a program at the program information interpreting part 37 (step S22). Based on the result of analysis, the browser processing part 34 generates GUI data. Thereafter, like the example of transmitting channel information over the remote-control command transfer connection, a screen drawn by the browser processing part 34 is transferred to the information output apparatus 1 as a video stream (steps S6 to S14 in FIG. 8).

FIG. 6 indicates different connections for transferring program information and a remote control command. However, a single connection may be used for both of the program information and the remote control command.

Moreover, there is a possibility that program information changes depending on broadcast programs, time, etc. Therefore, it may be performed at the tuning part 11 of the information output apparatus 1 to confirm whether the program information has been changed, and if so, transmit new program information to the information generating apparatus 2 via the program information transmitting part 18. Of course, the tuning part 11 may transmit program information to the information generating apparatus 2 whenever it detects the program information irrespective of whether the program information has been changed. Furthermore, the remote-control command receiving part 31 of the information generating apparatus 2 may detect change in tuning information and update GUI data in accordance with the contents of the new tuning information. Likewise, the program information receiving part 36 of the information generating apparatus 2 may detect change in program information and update GUI data in accordance with the contents of the new program information.

In FIG. 6, program information is transmitted to the information generating apparatus 2 not over the remote-control command transfer connection but over the program information transfer connection. However, in a modified example to FIG. 6, the remote-control command transfer connection may be omitted. The internal configuration of the information processing system in this modification is shown in FIG. 9.

Figure 9:
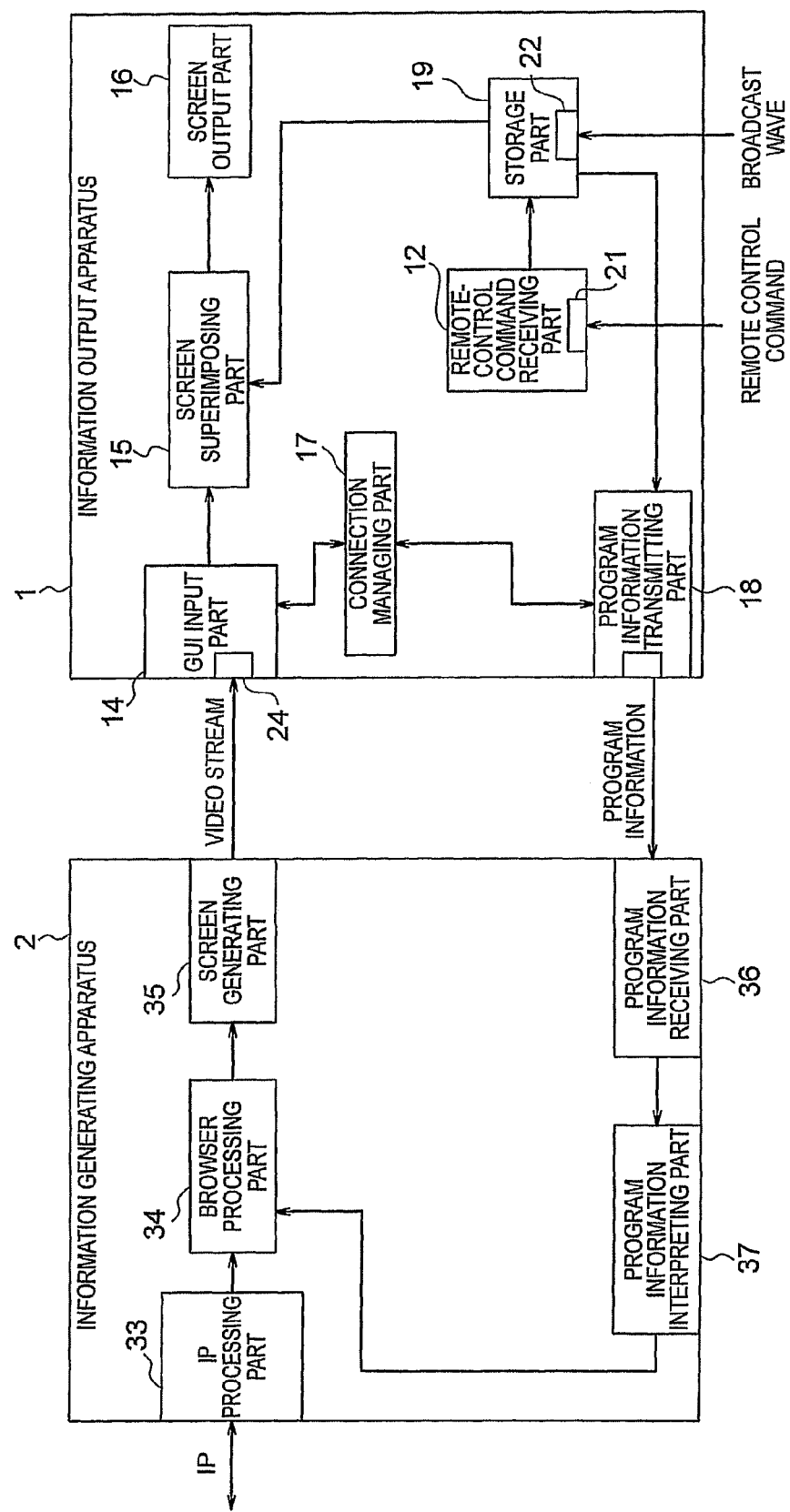
FIG. 9 is a block diagram of an information processing system, showing a modification to FIG. 6.

FIG. 9 is different from FIG. 6 in that a storage part 19 is provided instead of the tuning part 11, without the remote-control command transmitting part 13. The storage part 19 has functions of storing broadcast programs, playbacking the stored broadcast programs in accordance with commands from the remote-control command receiving part 12. It is assumed here that broadcast programs have been stored in the storage part 19.

On receiving a contents playback command from the remote-control command receiving part 12, the storage part 19 searches for specified contents and outputs searched contents to the screen superimposing part 15. The screen superimposing part 15 combines stored contents and a video stream input from the GUI input part 14, and outputs them to the screen output part 16.

The information output apparatus 1 of FIG. 9 is not equipped with the tuning part 11. Therefore, the remote control command is not a tuning command but a command to playback particular contents. Accordingly, when a remote control command is transmitted to the information generating apparatus 2, the information generating apparatus 2 does not know what contents is to be playbacked and hence cannot generate a video stream related to the contents to be playbacked. However, program information is embedded in, or multiplexed with a broadcast program stream. Therefore, in this example, program information stored in the storage part 19 is extracted when playbacking and transmitted to the information generating apparatus 2. Then, the information generating apparatus 2 searches for a program now under playback by the information output apparatus 1 based on the program information. The searching process may be done by using an Internet server.

Described in this example is that program information is embedded in a broadcast program stream. In this case, the information output apparatus 1 may extract program information embedded in a stream while recording a broadcast program and store the program information as a file different from the broadcast program. Then, when there is a request for playbacking contents via a remote controller, the information output apparatus 1 can transmit the program information recorded separately from the broadcast program to the information generating apparatus 2. The transmission can be done by using a remote-control command transfer connection (not shown). The request for playbacking contents of the storage part by a remote control command may also be transferred from the information output apparatus 1 to the information generating apparatus 2 over a remote-control command transfer connection (not shown).

The information processing system of FIG. 3 does not assume that a control command is transmitted from the information generating apparatus 2 to the information output apparatus 1. Accordingly, what the information generating apparatus 2 performs is only to generate a video stream and transmit it to the information output apparatus 1 in response to a remote control command from the information output apparatus 1. Therefore, the information generating apparatus 2 does not make full use of its processing functions it originally possesses. Accordingly, the information generating apparatus 2 may transmit a control command to the information output apparatus 1 as explained below.

Figure 10:
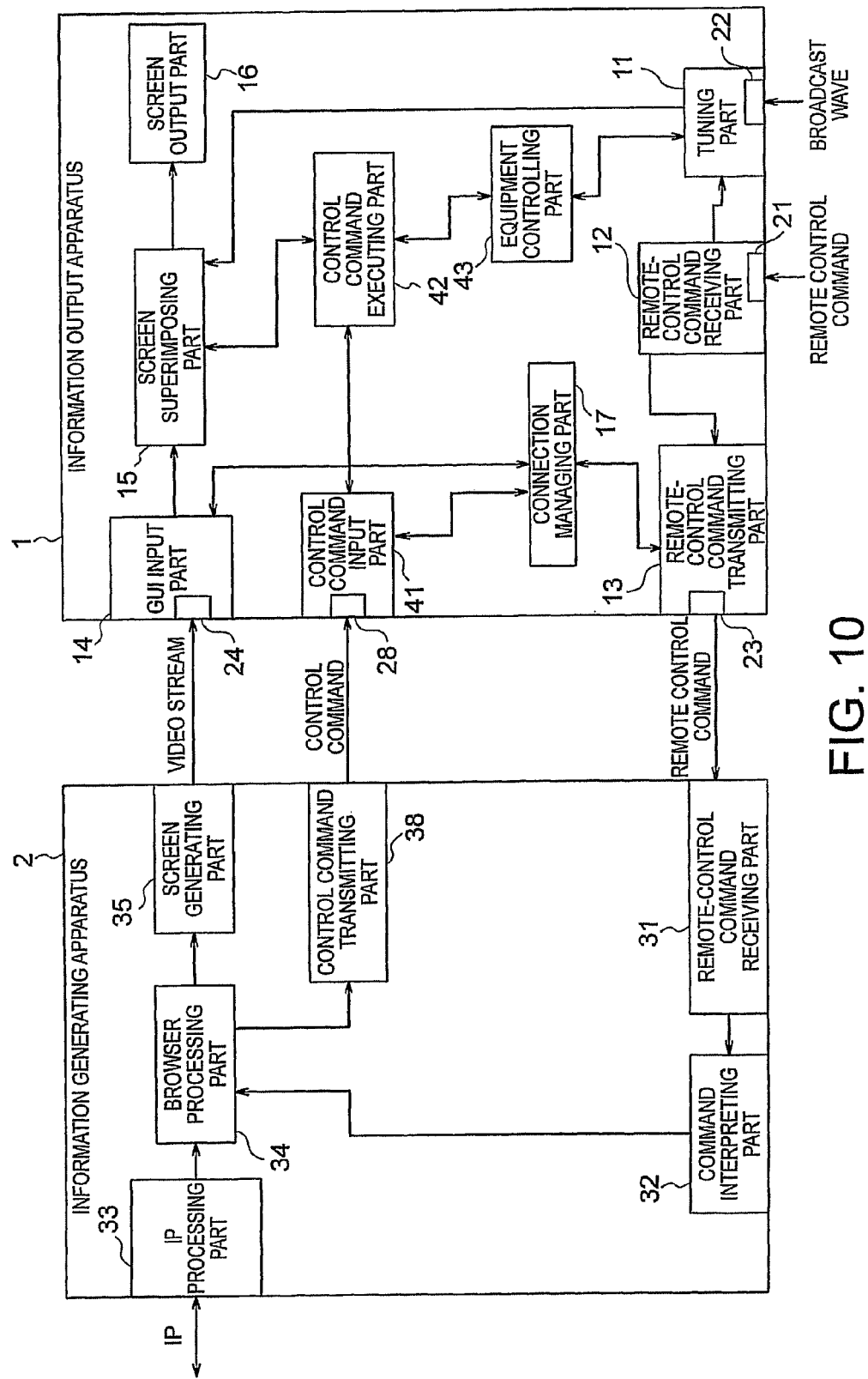
FIG. 10 is a block diagram of an information processing system, showing a modification to FIG. 3.

FIG. 10 is a block diagram schematically showing the configuration of an information processing system that is a modification to FIG. 3. The difference of FIG. 10 from FIG. 3 is that the information output apparatus 1 has a control command input part 41, a control command executing part 42, and an equipment controlling part 43, and the information generating apparatus 2 has a control command transmitting part 38.

The control command transmitting part 38 generates a control command to be transmitted to the information output apparatus 1 based on GUI data generated by the browser processing part 34 and transmits the control command to the information output apparatus 1. The control command input part 41 receives the control command transmitted from the information generating apparatus 2. The control command executing part 42 interprets the control command input by the control command input part 41.

Like FIG. 3, the information output apparatus 1 of FIG. 10 has a first interface part 21, a second interface part 22, a third interface part 23, a fourth interface part 24, a first connection establishing part, and a second connection establishing part. In addition, the information output apparatus 1 of FIG. 10 has a fifth interface part 28 and a third connection establishing part.

The fifth interface part 28 receives a control command transmitted from the information generating apparatus 2. The third connection establishing part establishes a connection for receiving the control command transmitted from the information generating apparatus 2.

The connection managing part 17 in the information output apparatus 1 confirms that the first, second and third connection establishing parts establish connections with the same information generating apparatus 2. When a connection established between any of the first to the third connection establishing parts and the information generating apparatus 2 is cut off, the connection establishing part detects it and notifies the connection managing part 17 of it. On receiving the notification of any of the connections being cut off, it is preferable for the connection managing part 17 to perform an error handling step, for example, to the connection establishing part that manages the cut off connection for reconnection with the information generating apparatus 2 or performs a process of notifying a user with any means.

The third connection establishing part is realized by software that runs on the fifth interface part 28, for example.

Figure 11:
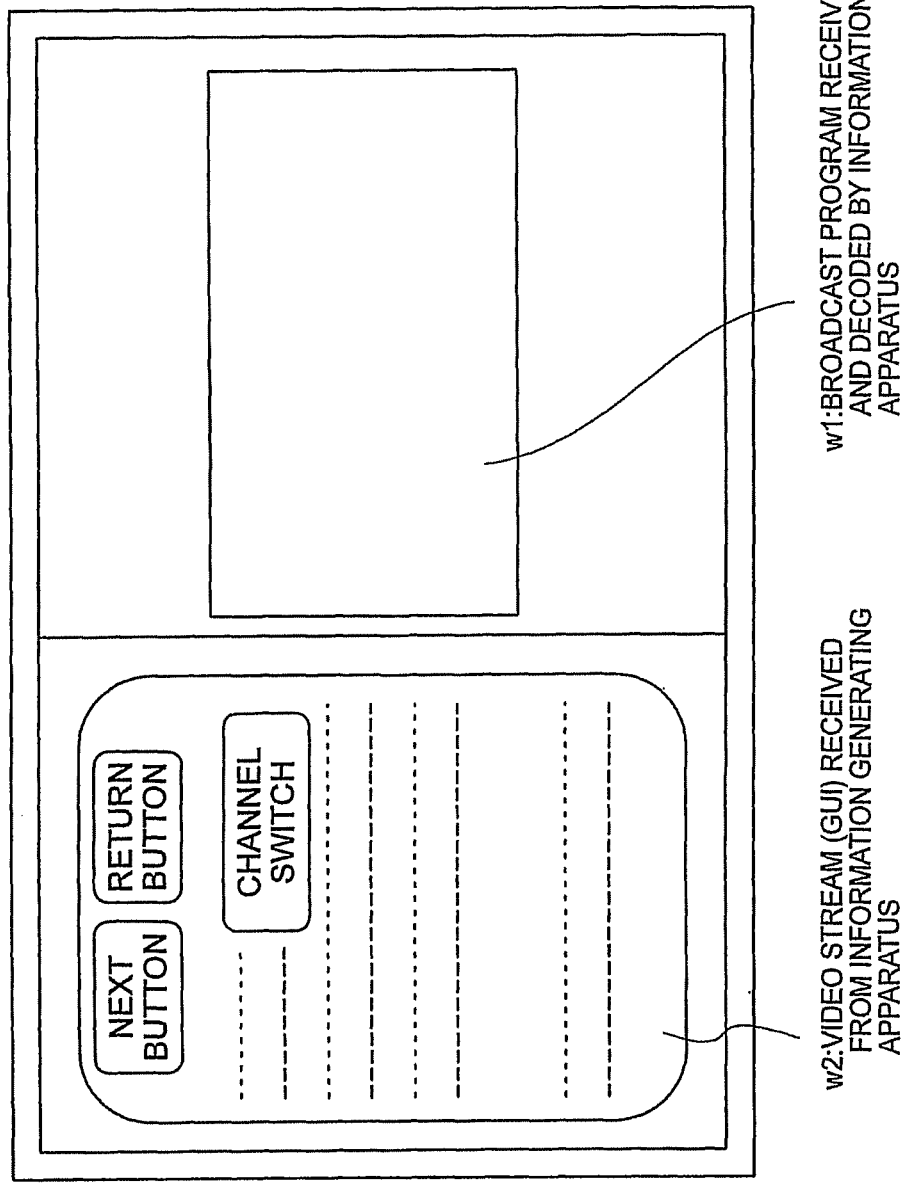
FIG. 11 a view showing an example of a window displayed on an information output apparatus 1 of FIG. 10.

FIG. 11 a view showing an example of a screen displayed on the information output apparatus 1 of FIG. 10. The difference of FIG. 11 from FIG. 5 is that a channel switch button is provided in a left window w2 generated by the information generating apparatus 2. When the channel switch button is selected with a cursor, the broadcast program in a right window w1 is switched by a hyperlink function. A method for realizing this example will be described below.

What is the same as the first embodiment is that the browser processing part 34 of the information generating apparatus 2 performs a process of assembling GUI data in accordance with a command described in a resource file such as HTML or JavaScript.

Figure 12:
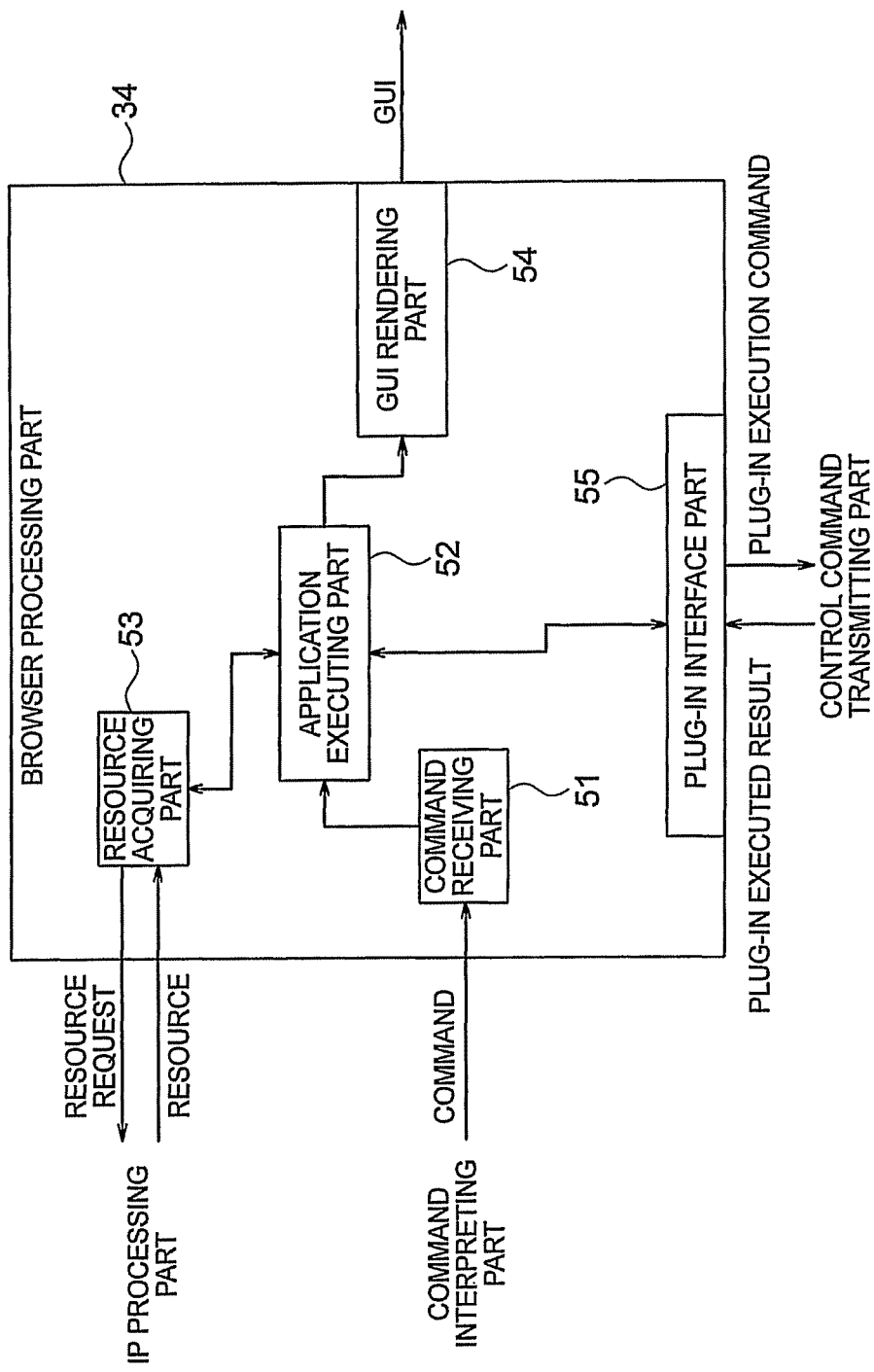
FIG. 12 is a block diagram showing an example of the internal configuration of a browser processing part 34 of FIG. 10.

FIG. 12 is a block diagram showing an example of the internal configuration of the browser processing part 34 of FIG. 10. The browser processing part 34 performs a process defined in HTML, JavaScript, or the like that is an application. Any process that is not defined in HTML, JavaScript or the like, for example, a process of acquiring the current program information, switching the channel, etc. is performed by the control command transmitting part 38.

The browser processing part 34 of FIG. 12 has a command receiving part 51, an application executing part 52, a resource acquiring part 53, a GUI rendering part 54, and a plug-in interface part 55. The command receiving part 51 receives a command for selecting a hyperlink, moving a cursor, etc. The application executing part 52 executes a command included in a resource file such as an HTML file or JavaScript. The resource acquiring part 53 acquires a resource file such as an HTML file or JavaScript for composing a window, executing a command, etc. from a network server or a storage (not shown) in the information generating apparatus 2 in response to a request of the application executing part 52. The GUI rendering part 54 acquires a result of execution of a command by the application executing part 52 and generates GUI data.

For example, when the command receiving part 51 interprets a command as moving a cursor on a hyperlink, the application executing part 52 performs a process of notifying a GUI generating part (the GUI rendering part 54?) to change portion to be highlighted. When the command receiving part 51 interprets a command as depressing a button on a hyperlink and when the application executing part 52 determines that the hyperlink is provided for a request for acquiring a new resource file, the application executing part 52 acquires a resource file such as an HTML file or JavaScript for composing GUI data through the resource acquiring part 53.

When an HTML/JavaScript application has issued a command that is not defined in HTML, JavaScript, etc. to the application executing part 52, the plug-in interface part 55 takes over the command from the application executing part 52 and issues the command to the control command transmitting part 38.

Explained below is the relationship between the browser processing part 34 and the control command transmitting part 38. When an application composed of HTML/JavaScript issues a command, the browser processing part 34 determines whether it is an instruction capable of being executed by the browser processing part 34 or it is an instruction having no definition. If the command can be executed at the browser processing part 34, the application executing part 52 in the browser processing part 34 executes it. If it is determined that the command is not defined, in the browser processing part 34 but defined in the control command transmitting part 38, the browser processing part 34 performs a process of handing the command over to the control command transmitting part 38.

A plurality of control command transmitting parts 38 may be provided. In this case, the browser processing part 34 also performs a process of determining to which control command transmitting part 38 it hands over a command. The process may use a MIME Type, a file extension or the like as information indicating which command corresponds to which control command transmitting part 38. That is, preceding to running an application, the control command transmitting parts 38 registers a supported MIME Type or file extension to the browser processing part 34.

The application executing part 52 loads an application composed of HTML/JavaScript from the resource acquiring part 53 or a storage part (not shown) in the information generating apparatus 2. When issuing a command, the application specifies an object for transmitting the command with a MIME Type or a file extension. The application executing part 52 determines whether the command is a MIME Type or a file extension it can process, the command is to be processed by the control command transmitting part 38, or the command is a MIME Type or a file extension that cannot be processed by the control command transmitting part 38. If the application executing part 52 determines that it can process the command, it does so. If the application executing part 52 determines that the command can be processed by the control command transmitting part 38, it transmits the command to the control command transmitting part 38 through the plug-in interface part 55. If the application executing part 52 determines that the command cannot be processed, it performs an error handling process.

Figure 13:
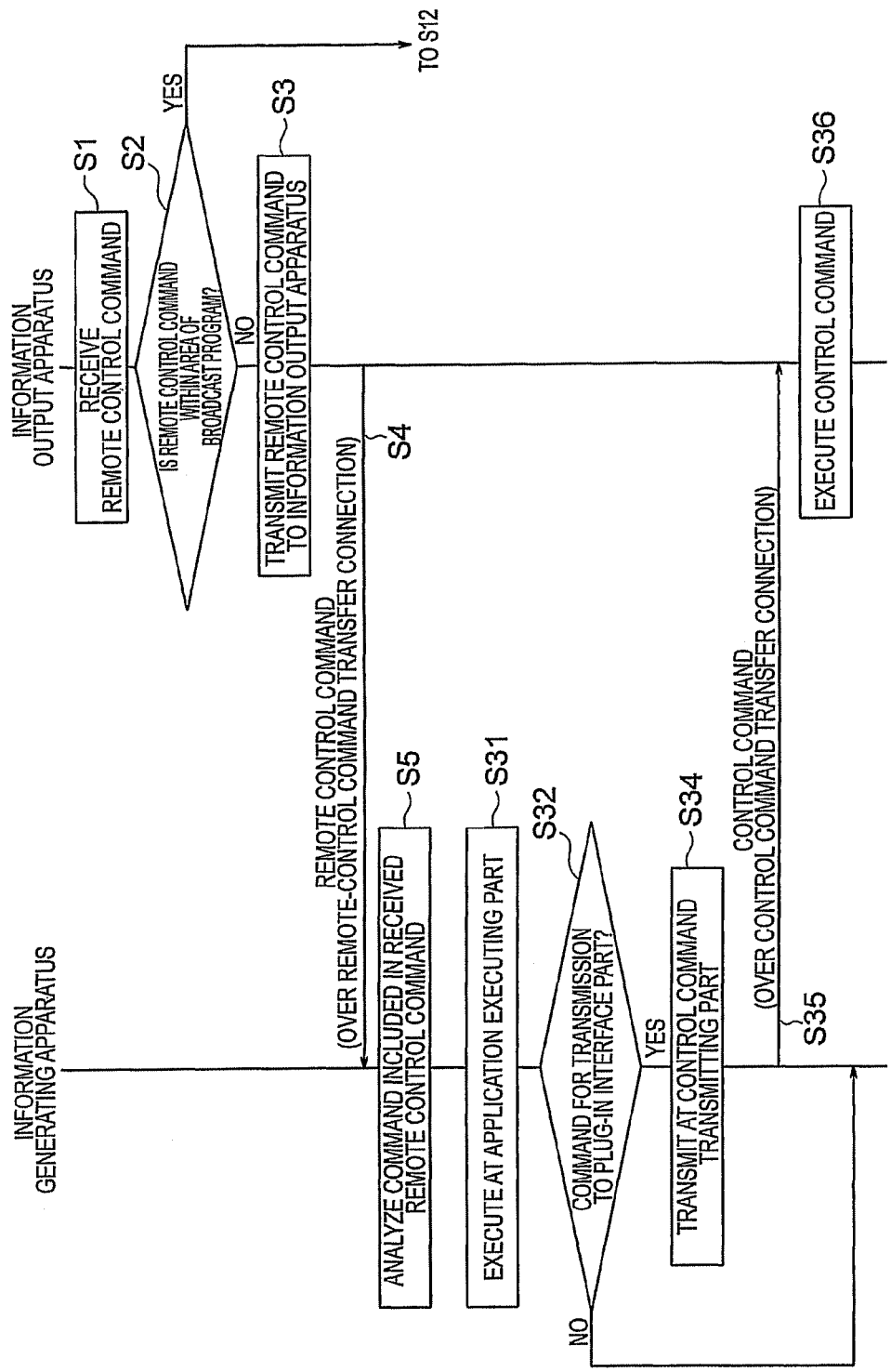
FIG. 13 is a sequence diagram showing an example of process steps of the information processing system of FIG. 10.
Figure 14:
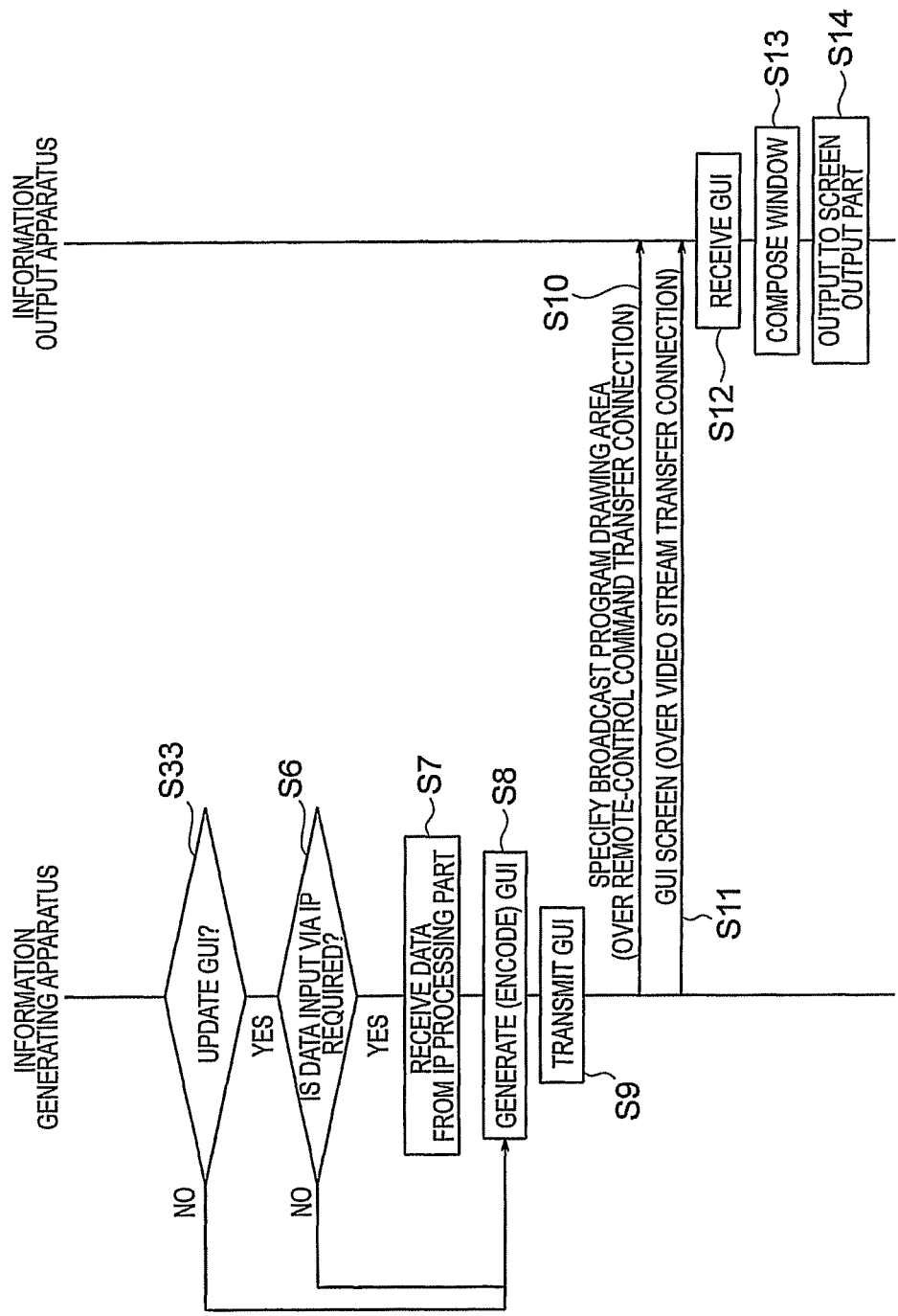
FIG. 14 is a sequence diagram following to FIG. 13.

FIGS. 13 and 14 are sequence diagrams showing process steps of the information processing system of FIG. 10. In FIG. 13, the steps common to FIGS. 7 and 8 are given the same step numbers. The different points will be mainly explained below.

The steps up to the analysis of a remote control command transmitted from the information output apparatus 1 to the information generating apparatus 2 (steps S1 to S5) are the same as in FIG. 4. When the command interpreting part 32 of the information generating apparatus 2 determines that a received remote control command is an enter-button depressing command, it is notified to the browser processing part 34. The browser processing part 34 receives the command at the command receiving part 51. Then, the application executing part 52 executes a hyperlink to be highlighted by a cursor (step S31).

The application executing part 52 determines whether the specified hyperlink is a MIME Type it can execute, a command that is to be handed over to the plug-in interface part 55 for processing or an undefined MIME Type (step S32).

If it is determined that the specified hyperlink is a MIME Type that can be executed by the application executing part 52, the same steps as steps S6 to S14 of FIG. 4 are performed. That is, the IP processing part 33 acquires a resource file (an HTML file, JavaScript, image file, etc.) that composes GUI data from a network server or a storage (not shown) in the information generating apparatus 2 (steps S6 to S7), and then GUI data is generated (step S8). At a moment when this GUI data is generated, the kind of MIME Type object to be called when the hyperlink of a channel switch button is selected and the command (for switching the channel to X) that corresponds to the object have already been decided. The process up to moving a cursor onto the channel switch button is also the same as the first embodiment. In detail, a user notifies the information output apparatus 1 of which position the cursor is to be moved, using a cross-key button on a remote controller, or the like. Then, the remote-control command receiving part 12 of the information output apparatus 1 receives the instruction and transmits a remote control command to the information generating apparatus 2 through the remote-control command transmitting part 13. And then, the information generating apparatus 2 moves the cursor to generate GUI data.

Next, suppose that, with the cursor being placed on the channel switch button, a user issues a command for depressing the button (for example, the user depresses the enter button of a remote control key). The remote-control command receiving part 12 of the information output apparatus 1 receives the information indicating that the enter button of the remote control key has been depressed and notifies the information generating apparatus 2 of it via the remote-control command transmitting part 13. In this example, the linkage indicates the channel switch button. Therefore, the object with the MIME Type of the channel switch button is not executable by the application executing part 52, and therefore the control command transmitting part 38 handles the object with the MIME Type. Accordingly, the application executing part 52 transmits the command (for switching the cannel to X) to the plug-in interface part 55. Then, the plug-in interface part 55 transmits a plug-in execution command to the control command transmitting part 38. The control command transmitting part 38 then transmits a channel switching command to the information output apparatus 1 (step S34). The channel switching command is transmitted to the information output apparatus 1 over a remote-control command transfer connection (step S35). The information output apparatus 1 receives the control command from the information generating apparatus 2 and executes it (step S36).

In order to perform the series of steps described above, an HTML file is described, for example, as follows.

```
<EMBED     NAME=Channel     SRC="channel.plg"
TYPE="application/x-toshiba-channel">
...
<FORM>
<INPUT     TYPE="button"     VALUE="channel     switch"
onClick="document.Channel.ChannelX( )">
</FORM>
...
```

In the above example, an action at the time when the channel switch button is depressed is to issue a command ChannelX to a Channel object. The MIME Type of the Channel object is x-toshiba-channel (indicated by a Type attribute). A command to x-toshiba-channel that is a MIME Type object is registered in the browser processing part 34 in advance so that the browser processing part 34 can transmit the command to the command transmitting part 38 when the command is given by an application.

When the channel switch button is depressed by a user operation, the browser processing part 34 firstly checks a MIME Type of its object. The target when the channel switch button is depressed is a Channel object. The MIME Type of the Channel object is x-toshiba-channel. It is then found that a command is to be transmitted to the control command transmitting part 38. Next, since a command to the object is ChannelX, the command ChannelX is transmitted to the control command transmitting part 38 via the plug-in interface part 55. The control command transmitting part 38 transmits a command for switching the tuning part 11 to be tuned to the channel X to the information output apparatus 1.

The information generating apparatus 2 receives a control command at the control command input part 41 and notifies the control command executing part 42 of the command. Since the command is to switch to the channel X, the control command executing part 42 instructs the tuning part 11 to be tuned to X. The tuning part 11 is then tuned to X and transmits a stream of a newly selected program to the screen superimposing part 15.

At the same time, the information generating apparatus 2 generates new GUI data if it is described in an HTML file or JavaScript that GUI data is updated after the channel switch button is depressed. If it is not necessary to generate new GUI data, the information generating apparatus 2 generates GUI data of the original window and transmits it to the information output apparatus 1.

On the contrary, if a command is determined as not be handed over to the plug-in interface part 55 in step S32, it is determined whether GUI data requires to be updated (step S36). Thereafter, steps S6 to S14 described above are performed.

Explained in the above example is the process of channel switch at the tuning part 11 as a control command. Besides this, usable control commands are, for example, as follows. (1) When the information output apparatus 1 has a function of storing contents such as broadcast programs, the control command is a command for playbacking specified contents. (2) When the information output apparatus 1 has external input terminals, the control command is a command for switching the contents to be transmitted to the screen superimposing part 15 from broadcast contents received at the tuning part 11 to a video stream to be transferred via HDMI. (3) When the information output apparatus 1 is connected to a home network and has a function of receiving contents from another external equipment in accordance with DLNA standards, the control command is a command for receiving contents and switching contents to be transmitted to the screen superimposing part 15 from broadcast contents received at the tuning part 11 to network contents in conformity with DLNA.

Explained in the above example is that, when the information generating apparatus 2 receives a remote control command, it transmits a control command to the information output apparatus 1, with the received remote control command as a trigger. A control command may, however, be transmitted to the information output apparatus 1, without a remote control command. For example, the information generating apparatus 2 may receive an instruction for channel switching at the tuning part 11 from a network server via the IP processing part 33 and transmit a control command for channel switching at the tuning part 11 to the information output apparatus 1 based on the instruction.

Figure 15:
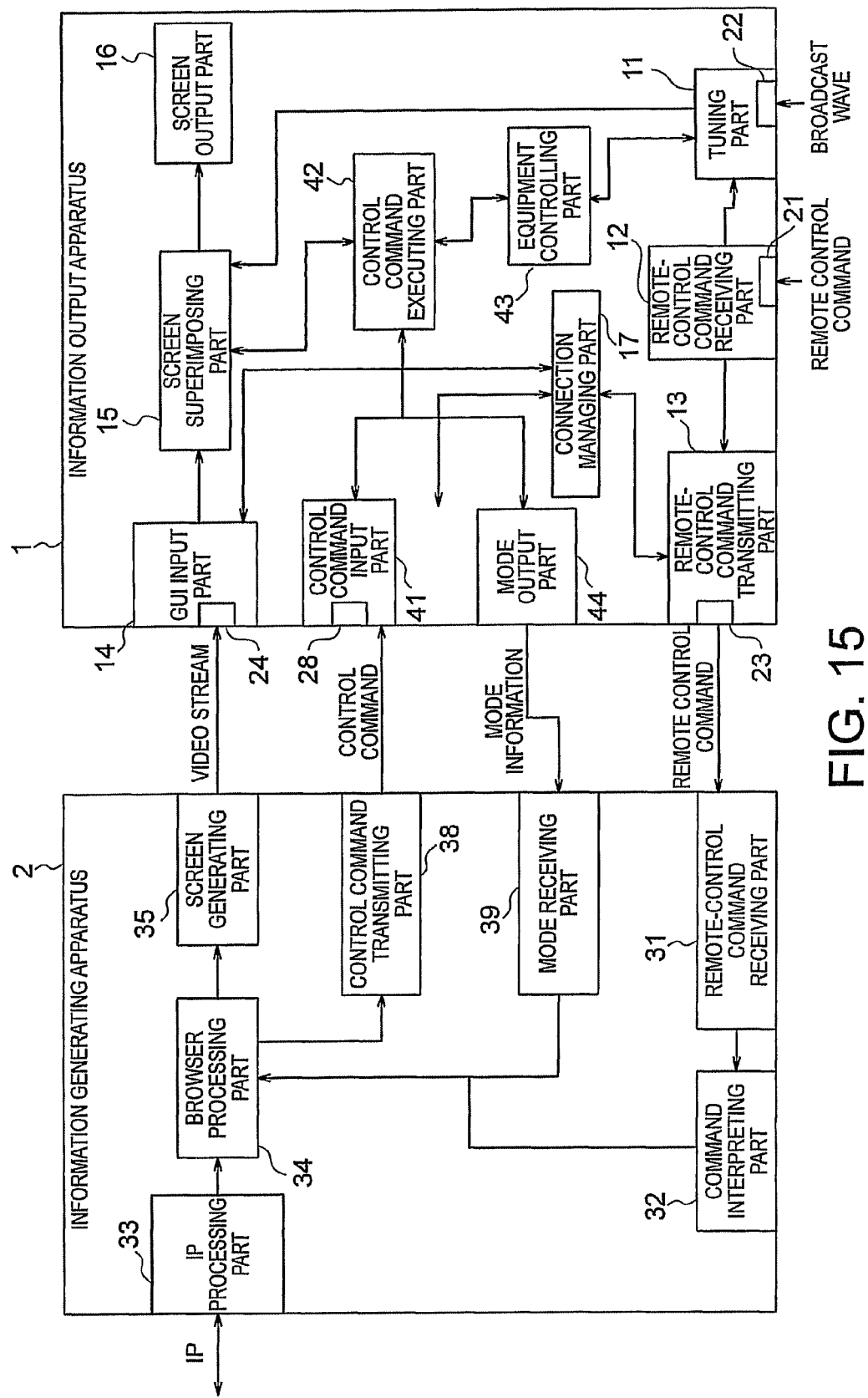
FIG. 15 is a block diagram schematically showing the configurations of an information generating apparatus 2 and an information output apparatus 1.

Moreover, not only instructing the information output apparatus 1 several types of control, the information generating apparatus 2 may transmit an instruction to the information output apparatus 1 to transmit information thereto. FIG. 15 is a block diagram schematically showing the configurations of the information generating apparatus 2 and the information output apparatus 1 in the case where the information generating apparatus 2 transmits a control command for requesting the information output apparatus 1 to transmit information. The difference of FIG. 15 from FIG. 10 is that the information generating apparatus 2 has a mode receiving part 39 and the information output apparatus 1 has a mode output part 44.

In FIG. 15, an example will be explained below in which the information generating apparatus 2 periodically transmits a control command for asking the information output apparatus 1 about which channel is now selected, and in response to this, the information output apparatus 1 returns the current channel information to the information generating apparatus 2.

Firstly, the information generating apparatus 2 loads a resource file including a control command described in an HTML file such as shown below from the IP processing part 33 or a storage part (not shown) in the information generating apparatus 2. In the example below, the information generating apparatus 2 loads (refreshes) a resource file at 100-second intervals and gives an instruction to call getChannel.plg at each loading.

Whenever the information generating apparatus 2 loads a resource file, it may acquire information from an internet server via the IP processing part 33 concerning, for example, to which channel the current channel is to be switched and switch the current channel. It is of course that, not only loading a resource file at 100-second intervals, the information generating apparatus 2 may load a resource file only once when activating an application. Furthermore, the information generating apparatus 2 may load a resource file at any timing, for example, when it receives a message from a server. Here, the MIME Type of getChannel.plg is x-toshiba-channel. This indicates that the control command transmitting part 38 is called.

```
...
<META HTTP-EQUIV="Refresh" CONTENT="100">
...
<EMBED            SRC="file://getChannel.plg"
TYPE="application/x-toshiba-channel">
...
```

The control command transmitting part 38 executes getChannel.plg. It is assumed in this example that getChannel.plg is a process of transmitting a control command for asking the information output apparatus 1 to transmit the current channel. The information output apparatus 1 confirms that the control command is a channel information acquisition command, at the control command input part 41. The control command executing part 42 asks the equipment controlling part 43 about channel selection information. The control command executing part 42 then transmits the inquiry to the tuning part 11. The tuning part 11 responds channel information on the channel currently output to the screen superimposing part 15 to the equipment controlling part 43. And, the control command executing part 42 instructs the mode output part 44 to transmit the channel information. Then, the mode output part 44 transmits the channel information on the currently receiving channel to the screen generating part 35.

FIG. 15 indicates separate connections for transferring mode information and a control command. However, the same connection may be provided for transferring both of mode information and a control command.

If it is described in an HTML file or JavaScript that GUI data is updated in accordance with the received channel information, the mode receiving part 39 generates new GUI data. On the contrary, if there is no necessity of updating, the mode receiving part 39 transmits the GUI data of an original window to the information output apparatus 1.

Figure 16:
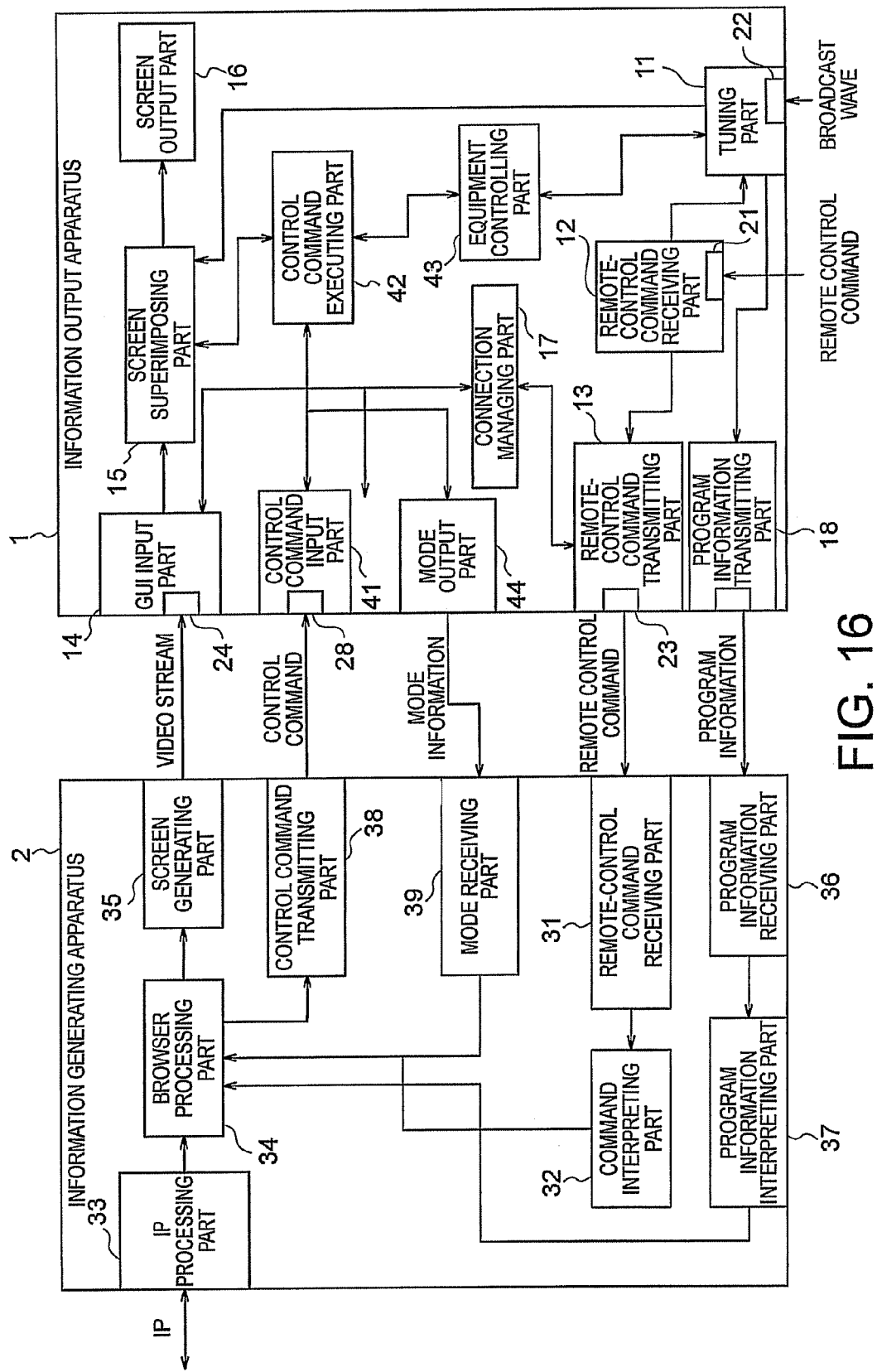
FIG. 16 is a block diagram schematically showing the configurations of the information output apparatus 1 and the information generating apparatus 2.

The control command may be such a command for requesting program information shown in FIG. 9. FIG. 16 is a block diagram schematically showing the configurations of the information output apparatus 1 and the information generating apparatus 2 in the case where the information generating apparatus 2 transmits to the information output apparatus 1 an instruction for requesting program information. The difference of FIG. 16 from FIG. 15 is that the information output apparatus 1 has a program information transmitting part 18 and the information generating apparatus 2 has a program information receiving part 36 and a program information interpreting part 37.

Firstly, the information generating apparatus 2 loads a resource file including commands such as shown below from the IP processing part 33 or a storage part (not shown) in the information generating apparatus 2. In this example, the information generating apparatus 2 loads (refreshes) a resource file at 100-second intervals and gives an instruction to call getChannelInfo.plg at each loading. It is of course that, not only loading a resource file at 100-second intervals, the information generating apparatus 2 may load a resource file only once when an application is activated. Furthermore, the information generating apparatus 2 may load a resource file at any timing, for example, when it receives a message from a server. Here, the MIME Type of getChannelInfo.plg is x-toshiba-channel. This indicates that the control command transmitting part 38 is called.

```
...
<META HTTP-EQUIV="Refresh" CONTENT="100">
...
<EMBED            SRC="file://getChannelInfo.plg"
TYPE="application/x-toshiba-channel">
...
```

The control command transmitting part 38 executes getChannlInfo.plg. It is a precondition in this example that getChannelInfo.plg is a process of transmitting a control command for asking the information output apparatus 1 about the transmission of program information on the current channel. The information output apparatus 1 confirms that the control command is a channel information acquisition command for the currently receiving program, at the control command input part 41. The control command executing part 42 instructs the equipment controlling part 43 to transmit program information to the information generating apparatus 2. The equipment controlling part 43 instructs the tuning part 11 to extract program information embedded in a broadcast stream. The tuning part 11 extracts program information and sends it to the program information transmitting part 18. Then, the program information transmitting part 18 transmits the program information to the information generating apparatus 2.

If an HTML file or JavaScript has a description that GUI data is updated after the issuance of a program information acquisition command, the information generating apparatus 2 generates new GUI data. On the contrary, if there is no necessity of updating, the information generating apparatus 2 transmits the GUI data of an original window to the information output apparatus 1.

The succeeding steps are the same as the first embodiment.

As described above, the information processing systems shown in FIGS. 10, 15 and 16 are different from those shown in FIGS. 3 and 6 in that the information generating apparatus 2 calls local functions of the information output apparatus 1, such as acquisition of currently tuned channel, program information on a currently received program, by means of a control command via a network.

The timing of transmission of a control command at the information generating apparatus 2 in FIGS. 10, 15 and 16 is decided by an application running on the browser processing part 34. The application may communicate with a server via the Internet. That is, the application may ask about a server information on when and what control command should be transmitted to the information output apparatus 1 and send a control command depending on the result of inquiry. For example, if an Internet server has gathered statistics on programs now on air and for which the number of viewers is the largest, an application that runs on the information generating apparatus 2 may ask about which channel is viewed by the largest number of viewers and instruct the information output apparatus 1 to change the program to be tuned depending on the result of acquisition.

As described above, in the first embodiment, the information output apparatus 1 transmits a remote control command to the information generating apparatus 2 which then interprets the remote control command, generates a video stream, and transmits it to the information output apparatus 1. Therefore, the information output apparatus 1 can easily combine a window for displaying a broadcast program received via a broadcast wave and a window for displaying a video stream generated by the information generating apparatus 2.

Moreover, in the information processing systems shown in FIGS. 10, 15 and 16, the information generating apparatus 2 transmits a control command to the information output apparatus 1. Therefore, with instructions from the information generating apparatus 2, it is possible to instruct the tuning part 11 in the information output apparatus 1 to switch the channel, to request the information output apparatus 1 to transmit desired information, to request the information output apparatus 1 to transmit program information, etc. Accordingly, several types of information processing can be done with the functions of information generating apparatus 2 without installing a high-performance processor in the information output apparatus 1. This results in restriction of hardware cost for the information output apparatus 1.

As for the information generating apparatus 2, general-use electric equipment equipped with a high-performance processor, such as a PC, a mobile phone and a smart phone can be used. The hardware cost for the entire information processing system can also be restricted.

Second Embodiment

The example explained in the first embodiment is that a resource file of GUI data composed of an HTML file, JavaScript or the like is loaded from a sever by the information generating apparatus 2 or loaded from a storage area (not shown) provided to the information generating apparatus 2. In contrast, the second embodiment which will be described below is characterized in that a resource file of GUI data composed of an HTML file, JavaScript or the like is included in broadcast wave data received by the information output apparatus 1.

In the second embodiment, there is a precondition that broadcast wave data to be received by the information output apparatus 1 includes a resource file, such as an HTML file or JavaScript, or is multiplexed with a resource file including positional information (URL) indicating where on the Internet those resource files are located. Another precondition is that a window such as shown in FIG. 2 can be generated based on video stream information. A technique for multiplexing a broadcast stream with a resource file, URL, etc. and specifications for combining a resource file and broadcast contents on the same window are described, for example, in a non-patent literature.

Figure 17:
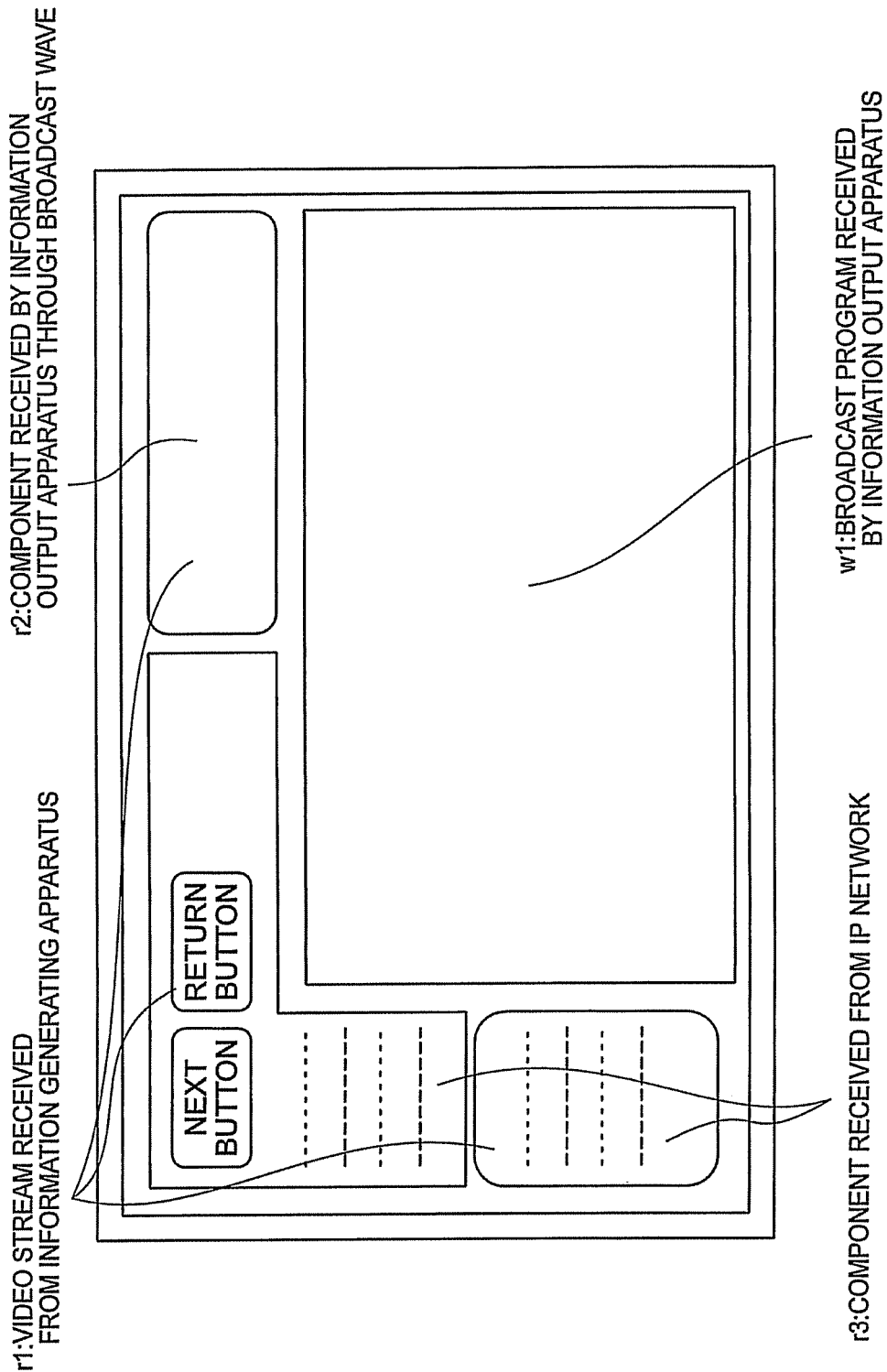
FIG. 17 is a view showing an example of a window generated by an information output apparatus 1 according to a second embodiment.

FIG. 17 is a view showing an example of a window generated by the information output apparatus 1 according to the second embodiment. It is the same as the first embodiment that a broadcast program received by the information output apparatus 1 and a video stream received by the information generating apparatus 2 are superimposed and displayed on the same screen. The difference between the first and second embodiments is that, in the first embodiment, all of the resource files of GUI DATA to be generated by the information generating apparatus 2 are held by the information generating apparatus 2, whereas, in the second embodiment, all of or part of resource files are held by the information output apparatus 1.

The example shown in FIG. 17 is composed of a window w1 for displaying broadcast video data received by the information output apparatus 1 and an area r1 for displaying a video stream generated by the information generating apparatus 2. The area r1 includes an area r2 that is generated based on a resource file received by the information output apparatus 1 and an area r3 that is generated based on a resource file received by the information generating apparatus 2 from the Internet or the like via the IP processing part 33. The entire area r1 may be made of the area r2 generated based on a resource file received by the information output apparatus 1 or the area r3 generated based on a resource file received by the information generating apparatus 2 from the Internet or the like via the IP processing part 33.

It is assumed here that the information output apparatus 1 is equipped with a broadcast receiving function but not with the browser processing part 34.

Figure 18:
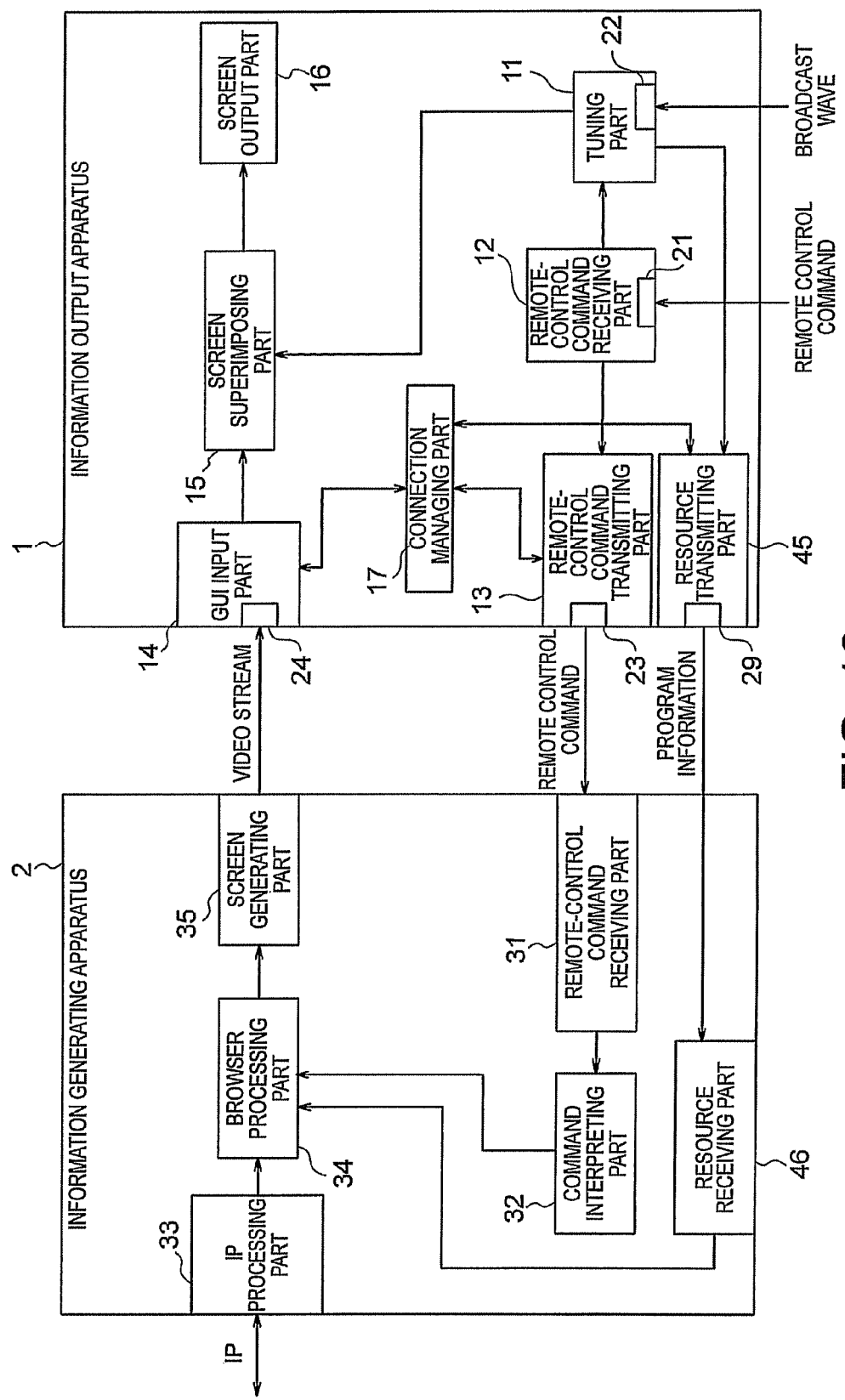
FIG. 18 is a block diagram schematically showing the configuration of an information processing system according to the second embodiment.

FIG. 18 is a block diagram schematically showing the configuration of an information processing system according to the second embodiment. The difference of FIG. 18 from FIG. 3 is that the information output apparatus 1 has a resource transmitting part 45 and a sixth interface part 29 for transmitting resource information required to generate images included in broadcast wave data, and a fourth connection establishing part, and the information generating apparatus 2 has a resource receiving part 46.

The tuning part 11 performs a process of extracting a resource file that forms GUI data indicating such as the location (URL) of an HTML file, JavaScript, an image file and other resource files from a received broadcast stream and passes the extracted resource file to the resource transmitting part 45. Moving picture portions of broadcast contents are sent to the screen superimposing part 15. The resource transmitting part 45 transmits the resource file received from the tuning part 11 to the information generating apparatus 2.

The resource receiving part 46 passes the resource file received from the information output apparatus 1 to the browser processing part 34. The browser processing part 34 performs a process of retrieving the resource file, receiving additional resource files from the IP processing part 33 according to need, and assembles GUI data in accordance with a command described in an HTML file and JavaScript.

The fourth connection establishing part is used for establishing a resource information transfer connection to the information generating apparatus 2. The fourth connection establishing part is realized with software running on the sixth interface part 29, for example.

Explained next is a process flow in the second embodiment. A set-up process up to the connection of the information output apparatus 1 and the information generating apparatus 2 is the same as the first embodiment. Explained next is a process for the transition from a broadcast window to a window of FIG. 17. There are two cases in the second embodiment that the transition is performed with a remote control command and it is automatically performed with a command included in a broadcast stream.

Figure 19:
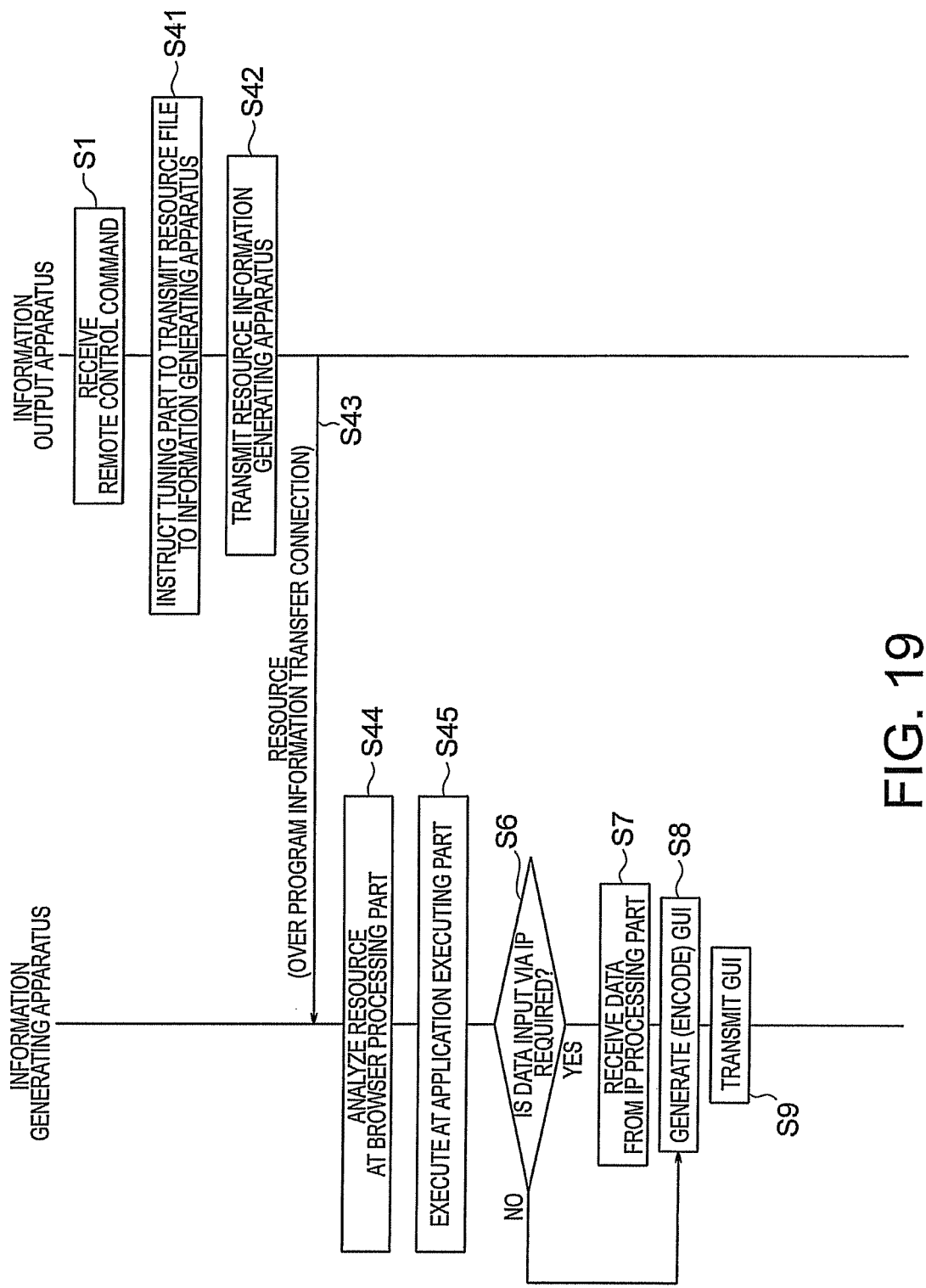
FIG. 19 is a sequence diagram showing process steps in the case of transition with a remote control command.
Figure 20:
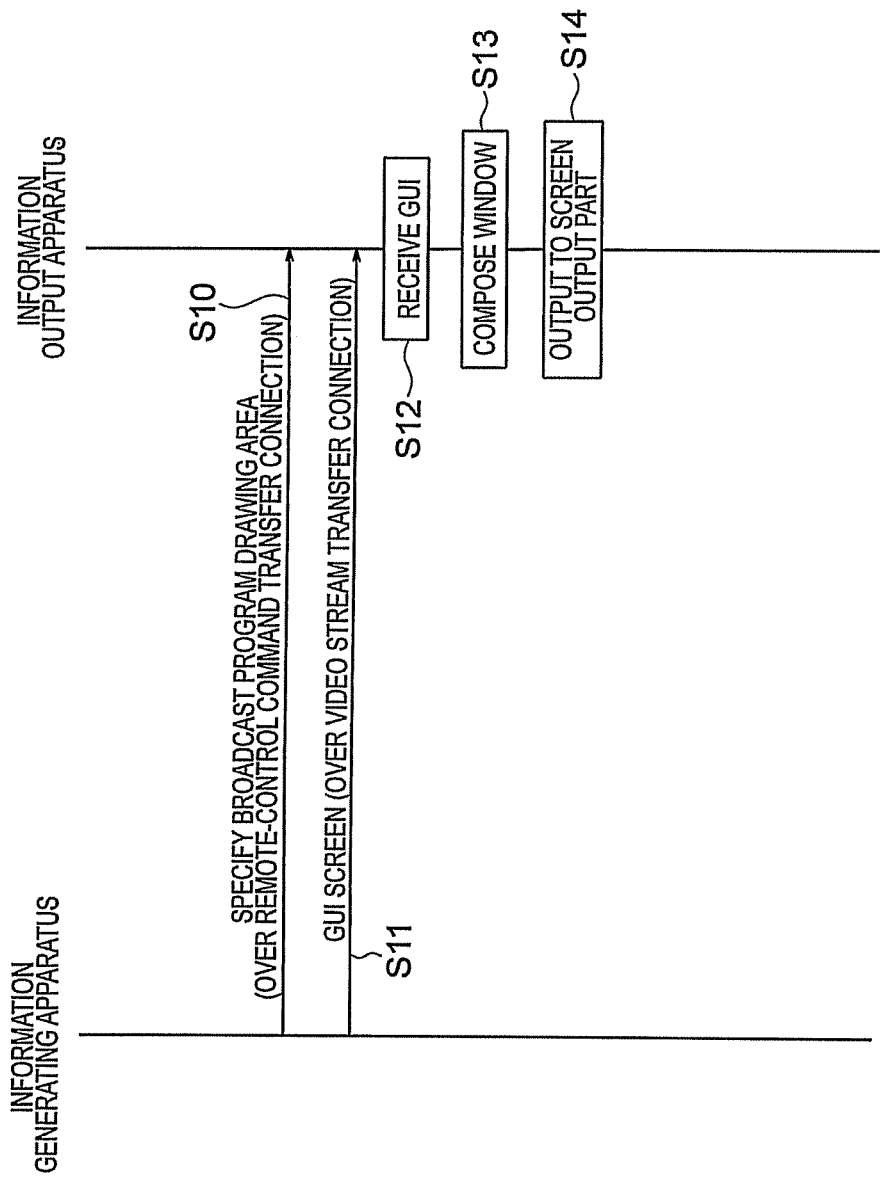
FIG. 20 is a sequence diagram following to FIG. 19.

Sequence diagrams of the process steps for the transition performed with a remote control command are shown in FIGS. 19 and 20. The information output apparatus 1 receives a remote control command (step S1) and instructs the tuning part 11 to extract a resource file and transmit it to the information generating apparatus 2 (step S41). In accordance with this instruction, instructs the tuning part 11 to extract a resource file and transmit it to the information generating apparatus 2 (step S42). In this case, the information output apparatus 1 transmits the resource file to the information generating apparatus 2 over a program information transfer connection (step S43).

After receiving the resource file such as an HTML file or JavaScript, the information generating apparatus 2 interprets the resource file at the browser processing part 34 (step S44).

Then, the browser processing part 34 runs an HTML/JavaScript application by using the resource file (step S45).

Information on what window size and which position a broadcast program is to be displayed or the like, is included in a resource file. The interpretation of a resource file is done by the information output apparatus 1. Therefore, the drawing area for a broadcast program can be specified over the remote-control command transfer connection. The succeeding steps are the same as the first embodiment.

Specifying a drawing area for broadcast contents can be done by the information output apparatus 1 if equipped with a function of extracting information on specifying the drawing area from a broadcast stream. The information generating apparatus 2 does not need to inform the information output apparatus 1 of it.

Figure 21:
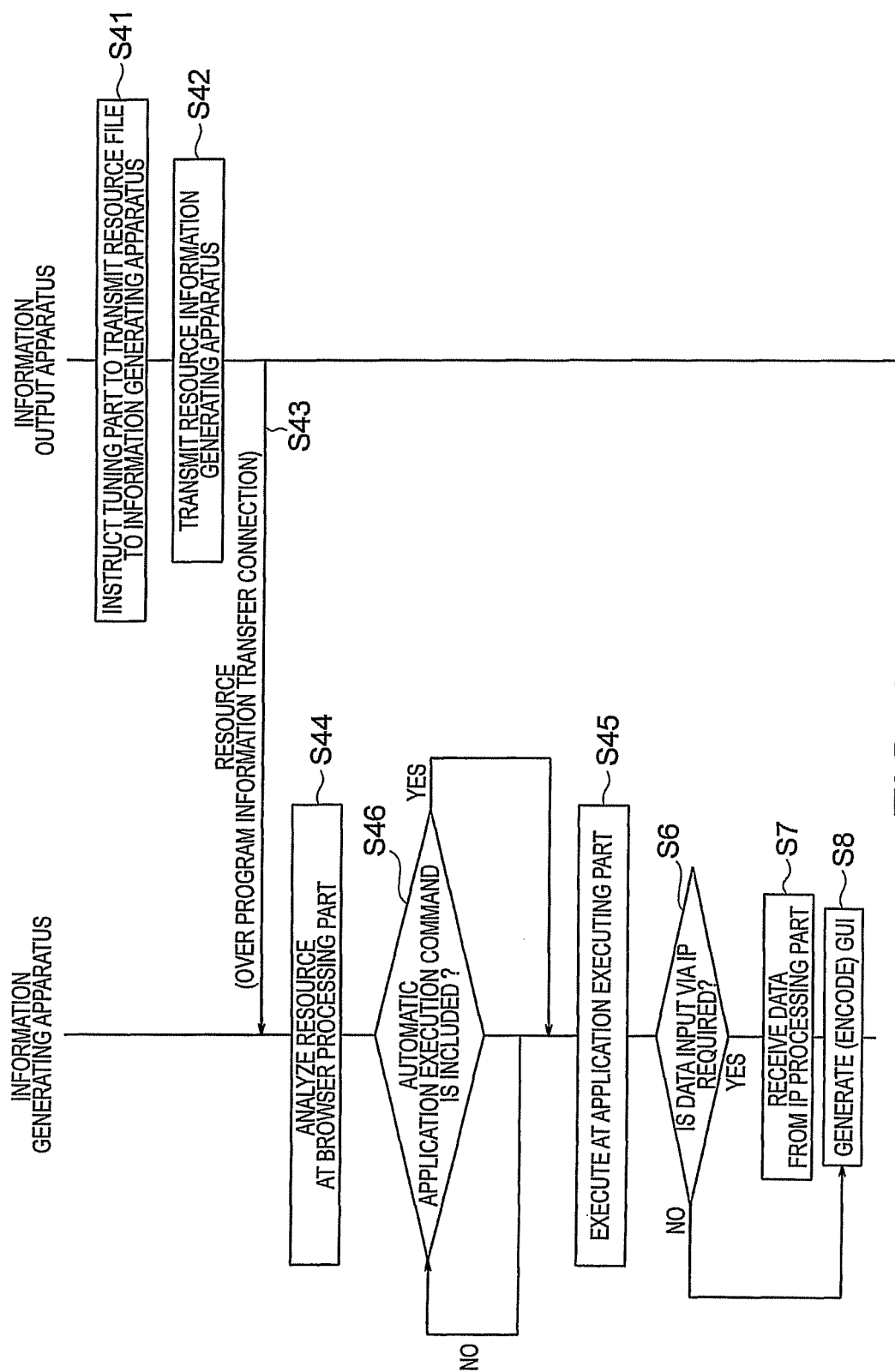
FIG. 21 is a sequence diagram showing a modification to FIG. 19.
Figure 22:
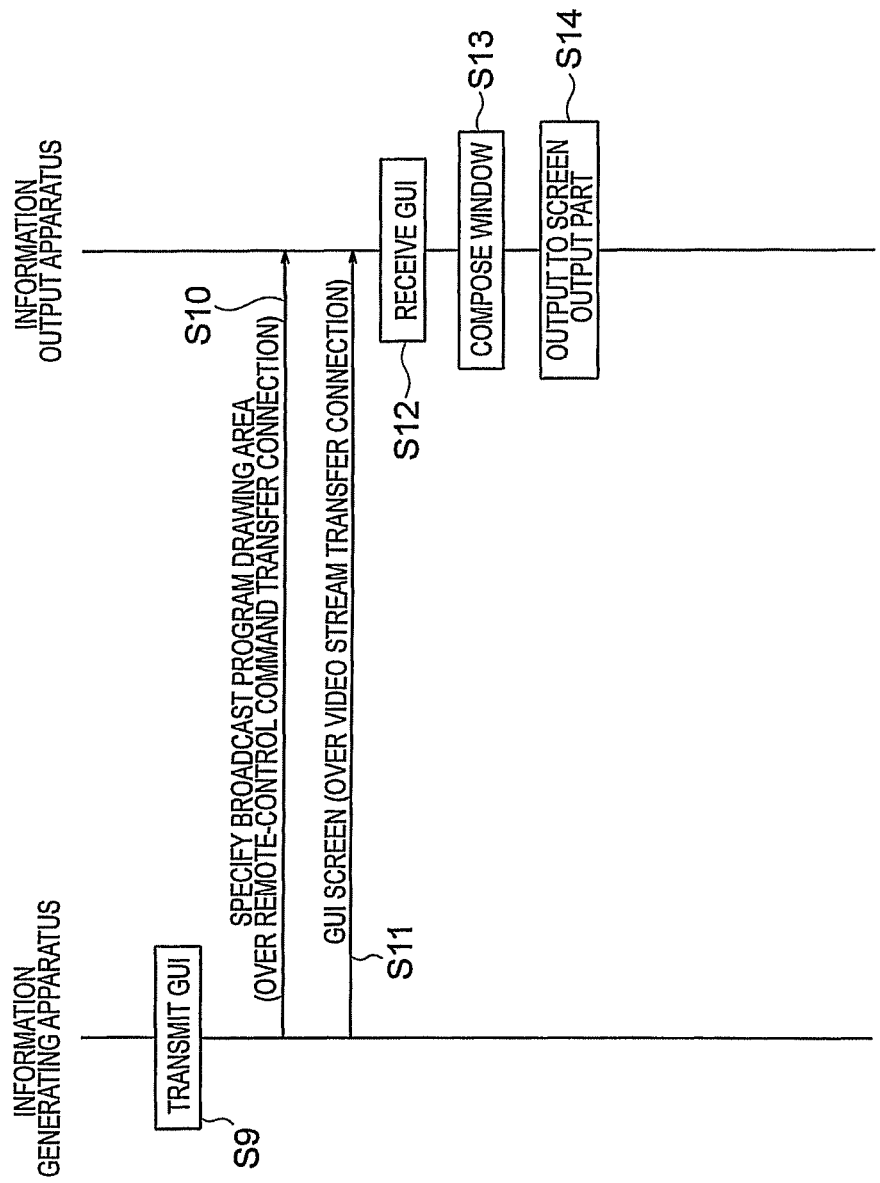
FIG. 22 is a sequence diagram following to FIG. 21.

Moreover, explained in the above example is that the information output apparatus 1 sends a resource file to the information generating apparatus 2, with a remote control command as a trigger. However, the tuning part 11 may be instructed to always extract a resource file irrespective of the existence of a remote control command and to transmit the resource file to the information generating apparatus 2 so that the browser processing part 34 of the information generating apparatus 2 can monitor the resource file. This allows the detection of timing of transition to the window of FIG. 17. The sequence diagrams for the process steps in this case are shown in FIGS. 21 and 22. Steps S41 to S44 are the same as FIG. 19. The information output apparatus 1 instructs the tuning part 11 to extract a resource file and transmit it to the information generating apparatus 2. The browser processing part 34 of the information generating apparatus 2 analyzes the received resource file and determines whether an automatic application execution command is included in the resource file (step S46). If not included, nothing is performed. That is, a broadcast program is only displayed on the information generating apparatus 2. If it is detected that an automatic application execution command is included, the execution of an application starts (step S45). The succeeding steps are the same as the first embodiment.

An authentication key exchange process may be performed for protecting the copyright of contents when the program information transfer connection is established. The authentication key exchange process may be achieved with a technique described in a no-patent literature, for example.

As described above, in the second embodiment, when broadcast wave data includes a resource file such as an HTML file, JavaScript, etc. or is multiplexed with a resource file including positional information (URL) indicating where on the Internet those resource files are located, the information generating apparatus 2 performs a process of processing a resource file to generate GUI data and the information output apparatus 1 combines the GUI data and broadcast contents. Accordingly, it is achieved that an insufficient portion of a resource file included in broadcast wave data is supplemented by the information generating apparatus 2, to superimpose broadcast contents and to display on the display part of the information output apparatus 1.

The second embodiment is useful especially when the information output apparatus 1 is not equipped with a browser function. The browser process requires a high-performance process such as processing of JavaScript. Therefore, drawing of GUI data may become slow if the browser process is performed by a low-performance processor of a digital TV or the like. Accordingly, in the second embodiment, a resource file that requires a high-performance process is processed by the information generating apparatus 2, such as a PC, having a high-performance processor and the result of the process is transmitted to the information output apparatus 1, such as a digital TV, having a low-performance processor, to superimpose broadcast contents. This results in lower cost of the information output apparatus 1.

At least part of the information generating apparatus 2 and the information output apparatus 1 explained in the embodiments may be configured with hardware or software. When it is configured with software, a program that performs at least part of the functions of the information generating apparatus 2 and the information output apparatus 1 may be stored in a storage medium such as a flexible disk and CD-ROM, and then installed in a computer to run thereon. The storage medium may not be limited to a detachable one such as a magnetic disk and an optical disk but may be a standalone type such as a hard disk drive and a memory.

Moreover, a program that achieves the function of at least part of the information generating apparatus 2 and the information output apparatus 1 may be distributed via a communication network (including wireless communication) such as the Internet. The program may also be distributed via an online network such as the Internet or a wireless network, or stored in a storage medium and distributed under the condition that the program is encrypted, modulated or compressed.

The embodiment of the present invention is not limited to the respective embodiments described above but includes a variety of modifications conceivable by parsons skilled in the art. The advantages of the present invention are also not limited to those explained above. Accordingly, various addition, changes, and partial omissions may be made without departing from the scope and spirit of the inventions derived from the accompanying claims and their equivalents.

The invention claimed is:

1. An information output apparatus, comprising:
a first interface to receive an equipment operational signal from a short-range wireless communication apparatus;
a second interface to receive broadcast wave data based on the equipment operational signal;
a third interface transmit the equipment operational signal to an information generating apparatus;
a fourth interface to receive video data transmitted from the information generating apparatus;
a fifth interface to receive a control command transmitted from the information generating apparatus in response to the equipment operational signal transmitted from the third interface part;
an information superimposing part to transmit the equipment operational signal from the third interface part to the information generating apparatus and then to superimpose video data updated by the information generating apparatus and received from the fourth interface part with the broadcast wave data to display the superimposed data on a display part;
a first connection establishing part to establish a connection for transmitting the equipment operational signal to the information generating apparatus via the third interface part;
a second connection establishing part to establish a connection for receiving video data via the fourth interface part;
a third connection establishing part to establish a connection for receiving the control instruction transmitted from the information generating apparatus;
a control command executing part to execute the control command received via the fifth interface part; and a connection managing part to confirm that the first, second and third connection establishing parts establish connections with the same information generating apparatus.

2. The apparatus of claim 1, wherein each of the first, second and third connection establishing parts establishes the corresponding connection by transmitting and receiving predetermined information by using the third interface part.

3. The apparatus of claim 1, wherein each of the first, second and third connection establishing parts establishes the corresponding connection by transmitting and receiving predetermined information by using the fourth interface part.

4. The apparatus of claim 1, wherein the connection managing part performs a predetermined error process when a connection between any of the first, second and third connection establishing parts and the information generating part is cut off.

5. The apparatus of claim 1, further comprising:
a sixth interface to transmit resource information necessary for generating video data to the information generating apparatus, the resource information being included in the broadcast wave data; and
a fourth connection establishing part to establish a connection for transmitting the resource information to the information generating apparatus.

6. The apparatus of claim 1, further comprising a tuner part to demodulate the broadcast wave data to generate a broadcast wave stream,
wherein information superimposing part superimposes the broadcast wave stream with the video data to display the superimposed data on the display part.

7. The apparatus of claim 6, wherein when a command for changing channel selection of the tuner part is included in the control command received by the fifth interface part, the control command executing part instructs the tuner part of change of the channel selection based on the command.

8. The apparatus of claim 6, further comprising:
a sixth interface to transmit, when an acquisition command of the program information is included in the control command received by the fifth interface part, program information acquired by the tuner part to the information generating apparatus based on the program information; and
a fourth connection establishing part to establish a connection for transmitting the program information to the information generating apparatus via the sixth interface part.

9. The apparatus of claim 1, further comprising a storage part to store the broadcast wave data,
wherein the information superimposing part superimposes the broadcast wave data stored in the storage part with the video data to display the superimposed data on the display part.

10. The apparatus of claim 1, wherein when a command for changing at least one of screen size or location on screen of the broadcast wave data and the video data is included in the control command received by the fifth interface part, the control command executing part controls superimposing the broadcast wave data and the video data.

11. The apparatus of claim 1, further comprising:
an area determination part to identify whether the equipment operational signal is a command for a drawing area of the broadcast wave data on a display screen of the display part or a command for the drawing area based on the video data received from the information generating apparatus,
wherein when it is determined to be the drawing area based on the video data determination by the area determination part, the equipment operational signal is transmitted from the third interface part to the information generating part.

12. The apparatus of claim 1, wherein the video data received by the fourth interface is non-compression data.

13. The apparatus of claim 1, wherein the control command received by the fifth interface is a command for changing at least one of: a screen size or an on-screen location of the video data displayed by the information output apparatus.

14. An information processing system, comprising:
an information output apparatus capable of displaying by superimposing a plurality of types of video data; and
an information generating apparatus to communicate with the information output apparatus,
wherein the information output apparatus comprises:
a first interface to receive an equipment operational signal from a short-range wireless communication apparatus;
a second interface to receive broadcast wave data based on the equipment operational signal;
a third interface to transmit the equipment operational signal to an information generating apparatus;
a fourth interface to receive video data transmitted from the information generating apparatus;
a fifth interface to receive a control command transmitted from the information generating apparatus in response to the equipment operational signal transmitted from the third interface part;
an information superimposing part to transmit the equipment operational signal from the third interface part to the information generating apparatus and then to superimpose video data updated by the information generating apparatus and received from the fourth interface part with the broadcast wave data to display the superimposed data on a display part;
a first connection establishing part to establish a connection for transmitting the equipment operational signal to the information generating apparatus via the third interface part;
a second connection establishing part to establish a connection for receiving video data via the fourth interface part;
a third connection establishing part to establish a connection for receiving the control instruction transmitted from the information generating apparatus;
a control command executing part to execute the control command received via the fifth interface part; and
a connection managing part to confirm that the first, second and third connection establishing parts establish connections with the same information generating apparatus,
wherein the information generating apparatus comprises:
an interpreting part to receive and interpret the equipment operational signal;
a resource acquiring part to acquire a resource file from an external network;
a browser processing part to generate GUI data based on a result interpreted by the interpreting part and the resource file;
a screen generating part to generate the video data to be transmitted to the information output apparatus; and
a control command transmitting part to generate the control command based on the GUI data to transmit the control command to the information output apparatus.

15. The system of claim 14,
wherein the information output part comprises:

a sixth interface to transmit resource information necessary for generating video data, the resource information being included in the broadcast wave data; and a fourth connection establishing part to establish a connection for transmitting the resource information to the information generating apparatus, the information generating apparatus comprises a resource receiving part to receive the resource information, the browser processing part acquiring a missing portion of the resource information received by the resource receiving part via the resource acquiring part to generate the GUI data.

16. An information processing method of transmitting and receiving information between an information output apparatus capable of superimposing a plurality of types of video data and an information generating apparatus for communicating with the information output apparatus, wherein the information output apparatus comprising:

receiving by a first interface part, an equipment operational signal from a short-range wireless communication apparatus;

receiving by a second interface part, broadcast wave data based on the equipment operational signal;

transmitting by a third interface part, the equipment operational signal to an information generating apparatus;

receiving by a fourth interface part, video data transmitted from the information generating apparatus;

receiving by a fifth interface part, a control command transmitted from the information generating apparatus in response to the equipment operational signal transmitted from the third interface part;

transmitting by an information superimposing part, the equipment operational signal from the third interface part to the information generating apparatus and then to superimpose video data updated by the information generating apparatus and received from the fourth interface part with the broadcast wave data to display the superimposed data on a display part;

establishing by a first connection establishing part, a connection for transmitting the equipment operational signal to the information generating apparatus via the third interface part;

establishing by a second connection establishing part, a connection for receiving video data via the fourth interface part;

establishing by a third connection establishing part, a connection for receiving the control instruction transmitted from the information generating apparatus;

executing by a control command executing part, the control command received via the fifth interface part; and confirming that the first, second and third connection establishing parts establish connections with the same information generating apparatus, and wherein the information generating apparatus comprising:

receiving and interpreting the equipment operational signal;

acquiring a resource file from an external network; generating the video data for to be transmitted to the information output apparatus based on the GUI data;

generating the control command based on the GUI data to transmit the control command to the information output apparatus.

17. The method of claim 16, wherein each of the first, second and third connection establishing parts establishes the corresponding connection by transmitting and receiving predetermined information by using the third interface part.

18. The method of claim 16, wherein each of the first, second and third connection establishing parts establishes the corresponding connection by transmitting and receiving predetermined information by using the fourth interface part.

19. The method of claim 16, wherein when confirming that the first, second and third connection establishing parts establish connections with the same information generating apparatus, a predetermined error process is performed if a connection between any of the first, second and third connection establishing parts and the information generating part is cut off.

20. The method of claim 16, wherein resource information necessary for generating video data is transmitted to the information generating apparatus, the resource information being included in the broadcast wave data; and a connection for transmitting the resource information to the information generating apparatus is established.

21. The method of claim 16, wherein the broadcast wave data is demodulated by a tuner part to generate a broadcast wave stream, and the broadcast wave stream is superimposed with the video data to display the superimposed data on the display part.

22. The method of claim 16, wherein the broadcast wave data is stored in a storage part, and the broadcast wave data stored in the storage part is superimposed with the video data to display the superimposed data on the display part.

* * * * *